US012724358B2

(12) United States Patent
Hongo et al.

(10) Patent No.: US 12,724,358 B2
(45) Date of Patent: Sep. 1, 2026

(54) ELECTROPHOTOGRAPHIC MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Masatsugu Hongo, Shizuoka (JP); Katsuya Kodama, Kanagawa (JP); Hiroaki Watanabe, Kanagawa (JP); Atsushi Uematsu, Shizuoka (JP); Yuichi Kikuchi, Shizuoka (JP); Satoru Nishioka, Shizuoka (JP); Yasuhiro Fushimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/095,499

(22) Filed: Mar. 31, 2025

(65) Prior Publication Data

US 2025/0314988 A1 Oct. 9, 2025

(30) Foreign Application Priority Data

Apr. 4, 2024 (JP) ................................ 2024-060924

(51) Int. Cl.
*G03G 15/02* (2006.01)
*G03G 21/18* (2006.01)

(52) U.S. Cl.
CPC ..... *G03G 15/0233* (2013.01); *G03G 21/1814* (2013.01)

(58) Field of Classification Search
CPC ........... G03G 15/0233; G03G 15/0818; G03G 21/1814
See application file for complete search history.

(56) References Cited

U.S. PATENT DOCUMENTS 8,440,307 B2 5/2013 Nose et al.
8,481,167 B2 7/2013 Watanabe et al.
(Continued)

FOREIGN PATENT DOCUMENTS

JP 2020-166210 A 10/2020
JP 2021-67924 A 4/2021
(Continued)

OTHER PUBLICATIONS

Sanada, T., et al., Morphology Control of Polymer Alloy by Reactive Processing and Morphology Evolution, Sumitomo Chemical Co., Ltd. Petrochemicals Research Laboratory, pp. 42-54.
(Continued)

*Primary Examiner* — Carla J Therrien
(74) *Attorney, Agent, or Firm* — VENABLE LLP

(57) ABSTRACT

An electrophotographic member, comprising: a support member having a conductive outer surface; and a conductive layer disposed on an outer surface of the support member, wherein the conductive layer comprises a matrix comprising a first rubber, and a plurality of domains dispersed in the matrix, volume resistivity of the matrix is $1.00\times10^{12}$ Ω·cm or less, the plurality of domains comprise at least one domain A, and the domain A satisfies specific conditions, in a case where impedance of the electrophotographic member is measured by applying specific AC voltage while changing frequency in a range of $1.0\times10^{-2}$ to $1.0\times10^{7}$ Hz and the specific plotting is done, a slope at a specific frequency is −0.80 to −0.30, and the impedance in a specific frequency is $1.00\times10^{3}$ to $1.00\times10^{7}$Ω.

13 Claims, 11 Drawing Sheets

(56) References Cited

U.S. PATENT DOCUMENTS

| | | | |
|---|---|---|---|
| 8,491,994 | B2 | 7/2013 | Harada et al. |
| 8,501,312 | B2 | 8/2013 | Watanabe et al. |
| 8,538,298 | B2 | 9/2013 | Harada et al. |
| 8,622,881 | B1 | 1/2014 | Harada et al. |
| 8,628,854 | B2 | 1/2014 | Yamauchi et al. |
| 8,668,987 | B2 | 3/2014 | Yamauchi et al. |
| 8,685,601 | B2 | 4/2014 | Nose et al. |
| 8,715,830 | B2 | 5/2014 | Yamada et al. |
| 8,750,762 | B2 | 6/2014 | Harada et al. |
| 8,771,818 | B2 | 7/2014 | Nishioka et al. |
| 8,852,743 | B2 | 10/2014 | Kikuchi et al. |
| 8,923,732 | B2 | 12/2014 | Harada et al. |
| 8,991,053 | B2 | 3/2015 | Watanabe et al. |
| 9,075,333 | B2 | 7/2015 | Uematsu et al. |
| 9,128,403 | B2 | 9/2015 | Yamauchi et al. |
| 9,146,482 | B2 | 9/2015 | Watanabe et al. |
| 9,274,442 | B2 | 3/2016 | Sato et al. |
| 9,360,789 | B1 | 6/2016 | Masu et al. |
| 9,360,833 | B2 | 6/2016 | Terada et al. |
| 9,372,429 | B2 | 6/2016 | Watanabe et al. |
| 9,411,307 | B2 | 8/2016 | Matsuda et al. |
| 9,442,408 | B2 | 9/2016 | Yamauchi et al. |
| 9,442,451 | B2 | 9/2016 | Yamauchi et al. |
| 9,448,502 | B2 | 9/2016 | Taniguchi et al. |
| 9,581,931 | B2 | 2/2017 | Yamada et al. |
| 9,599,913 | B2 | 3/2017 | Nishioka et al. |
| 9,599,914 | B2 | 3/2017 | Uematsu et al. |
| 9,639,009 | B2 | 5/2017 | Yamaguchi et al. |
| 9,651,888 | B2 | 5/2017 | Muranaka et al. |
| 9,665,028 | B2 | 5/2017 | Arimura et al. |
| 9,740,133 | B2 | 8/2017 | Yamauchi et al. |
| 9,811,009 | B2 | 11/2017 | Yamada et al. |
| 9,897,931 | B2 | 2/2018 | Nishioka et al. |
| 9,904,199 | B2 | 2/2018 | Terada et al. |
| 9,910,379 | B2 | 3/2018 | Furukawa et al. |
| 9,958,802 | B2 | 5/2018 | Kikuchi et al. |
| 9,964,914 | B2 | 5/2018 | Arimura et al. |
| 9,977,353 | B2 | 5/2018 | Nishioka et al. |
| 10,018,927 | B2 | 7/2018 | Yamada et al. |
| 10,018,934 | B2 | 7/2018 | Yamada et al. |
| 10,025,216 | B2 | 7/2018 | Uematsu et al. |
| 10,108,129 | B2 | 10/2018 | Yamaguchi et al. |
| 10,146,149 | B2 | 12/2018 | Watanabe et al. |
| 10,248,042 | B2 | 4/2019 | Uematsu et al. |
| 10,280,148 | B2 | 5/2019 | Nishioka et al. |
| 10,317,811 | B2 | 6/2019 | Tomomizu et al. |
| 10,416,588 | B2 | 9/2019 | Masu et al. |
| 10,558,136 | B2 | 2/2020 | Furukawa et al. |
| 10,649,350 | B2 | 5/2020 | Yamaguchi et al. |
| 10,678,154 | B2 | 6/2020 | Takashima et al. |
| 10,678,158 | B2 | 6/2020 | Kikuchi et al. |
| 10,845,724 | B2 | 11/2020 | Kikuchi et al. |
| 11,112,719 | B2 | 9/2021 | Makisumi et al. |
| 11,112,748 | B2 | 9/2021 | Yamada et al. |
| 11,137,716 | B2 | 10/2021 | Hiyama et al. |
| 11,169,454 | B2 | 11/2021 | Nishioka et al. |
| 11,175,602 | B2 | 11/2021 | Nishioka et al. |
| 11,307,509 | B2 | 4/2022 | Hino et al. |
| 11,340,553 | B2 | 5/2022 | Watariguchi et al. |
| 11,347,156 | B2 | 5/2022 | Kurachi et al. |
| 11,366,402 | B2 | 6/2022 | Ishiduka et al. |
| 11,385,559 | B2 | 7/2022 | Kikuchi et al. |
| 11,392,050 | B2 | 7/2022 | Nishida et al. |
| 11,397,388 | B2 | 7/2022 | Nishioka et al. |
| 11,556,073 | B2 | 1/2023 | Fushimoto et al. |
| 11,586,121 | B2 | 2/2023 | Yamada et al. |
| 11,619,890 | B2 | 4/2023 | Uematsu et al. |
| 11,640,122 | B2 | 5/2023 | Kikuchi et al. |
| 11,644,761 | B2 | 5/2023 | Kodama et al. |
| 11,675,282 | B2 | 6/2023 | Yamaguchi et al. |
| 11,835,878 | B2 | 12/2023 | Kodama et al. |
| 11,971,683 | B2 | 4/2024 | Nishioka et al. |
| 12,032,331 | B2 | 7/2024 | Uematsu et al. |
| 12,259,674 | B2 | 3/2025 | Takashima et al. |
| 12,306,576 | B2 | 5/2025 | Segawa et al. |
| 2008/0042108 | A1 | 2/2008 | Tajima et al. |
| 2014/0219682 | A1 | 8/2014 | Tsuto et al. |
| 2020/0310266 | A1* | 10/2020 | Kikuchi ............... G03G 15/162 |
| 2021/0033996 | A1* | 2/2021 | Kikuchi ............. G03G 15/0233 |
| 2022/0229379 | A1 | 7/2022 | Kaneko et al. |
| 2022/0244673 | A1 | 8/2022 | Takashima et al. |
| 2023/0280667 | A1* | 9/2023 | Uematsu ............ G03G 15/0291 430/56 |
| 2023/0288826 | A1 | 9/2023 | Nakazono et al. |
| 2023/0288867 | A1 | 9/2023 | Shimozawa et al. |
| 2025/0102945 | A1 | 3/2025 | Nishioka et al. |
| 2025/0102946 | A1 | 3/2025 | Uematsu et al. |

FOREIGN PATENT DOCUMENTS

| | | | | |
|---|---|---|---|---|
| JP | 2022-76450 | A | 5/2022 | |
| WO | WO-2022097743 | A1 * | 5/2022 | .............. F16C 13/00 |

OTHER PUBLICATIONS

U.S. Appl. No. 19/095,468, Katsuya Kodama, filed Mar. 31, 2025.
U.S. Appl. No. 19/095,475, Hiroaki Watanabe, filed Mar. 31, 2025.

* cited by examiner

ELECTROPHOTOGRAPHIC MEMBER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic member, a process cartridge, and an electrophotographic image forming apparatus that can be used for electrophotography.

Description of the Related Art

In an electrophotographic image forming apparatus, conductive members are used as electrophotographic members such as a charging member, a transfer member, and a developing member. The conductive members play a role of transporting the charges from a conductive support member to a surface of the conductive member, and provides charges to a contacted object by discharging or triboelectric charging. As the conductive member, an electrophotographic member, constituted of a conductive support member and a conductive layer disposed on the support member, for example, is known.

The charging member is a member that generates discharge together with an electrophotographic photosensitive member, so as to charge the surface of the electrophotographic photosensitive member, and has to perform uniform charging on the electrophotographic photosensitive member. Recently a conductive member is required, which can form high quality images for a long period of time in an electrophotographic image forming process which has become faster and has a longer service life.

Japanese Patent Application Publication No. 2020-166210 discloses a conductive member which stably charges a charged member, even in the case of being applied to a high-speed electrophotographic image forming process. This conductive member has a conductive layer which includes a matrix containing a first rubber and a plurality of domains dispersed in the matrix, and the domain contains a second rubber and an electronic conductive agent.

SUMMARY OF THE INVENTION

Using the conductive member according to Japanese Patent Application Publication No. 2020-166210 as a charging member, the present inventors attempted to form images for a long period of time in a recent electrophotographic image forming process of which speed has been increased and of which service life has been prolonged. As a result, it was confirmed that this conductive member excels in uniform charging performance on a charged member, even in this faster electrophotographic image forming process. Specifically, when the micro-potential unevenness formed on the surface of the charged member cannot be sufficiently made uniform before reaching the charging step, an image that does not have to be formed ("ghost image") is formed overlapping an intended image due to this potential unevenness. But such a ghost image was not formed. This result indicates that the conductive member according to Japanese Patent Application Publication No. 2020-166210 sufficiently supports the faster electrophotographic image forming process.

However the present inventors recognized that problems remain in terms of supporting a longer service life. Specifically, in some cases, an adhering substance, such as toner which remains on the photosensitive member without being transferred onto paper, is noticeably deposited on the surface of the charging member, an over-discharge is generated at locations where an adhering substance is deposited, and white spot images are generated.

The present disclosure is oriented toward an electrophotographic member that can form a high quality image over a long period of time, even when this member is applied to the electrophotographic image forming process of the main body having a longer service life and faster speed.

Moreover, the present disclosure is oriented toward a process cartridge to form a high quality electrophotographic image. Furthermore, the present disclosure is oriented toward an electrophotographic image forming apparatus that can form a high quality electrophotographic image.

The present disclosure provides an electrophotographic member, comprising:

a support member having a conductive outer surface; and a conductive layer disposed on an outer surface of the support member, wherein the conductive layer comprises a matrix comprising a first rubber, and a plurality of domains dispersed in the matrix, volume resistivity of the matrix is $1.00\times10^{12}$ Ω·cm or less, the plurality of domains comprise at least one domain A, and the domain A satisfies <Condition 1> to <Condition 3> below:

<Condition 1> the domain A comprises a second rubber and an electronic conductive agent;

<Condition 2> a centroid of volume of the domain A exists in the domain A;

<Condition 3> on a cross-section of the domain A passing through the centroid of volume, volume resistivity of an outer peripheral region, which is a region of a 100 nm distance from an outer edge of the domain A toward the centroid of volume, is more than $1.00\times10^{12}$ Ω·cm, and wherein in a case where a platinum electrode is directly disposed on an outer surface of the electrophotographic member, impedance is measured by applying AC voltage having a 1V amplitude between the outer surface of the support member and the platinum electrode in an environment of a 23° C. temperature and 50% relative humidity, while changing frequency in a range of $1.0\times10^{-2}$ to $1.0\times10^{7}$ Hz, and the frequency is plotted on an abscissa and the impedance is plotted on an ordinate of a log-log graph, a slope at a frequency range of $1.0\times10^{5}$ to $1.0\times10^{6}$ Hz is −0.80 to −0.30, and the impedance in a frequency range of $1.0\times10^{-2}$ to $1.0\times10^{3}$ Hz is $1.00\times10^{1}$ to $1.00\times10^{7}$Ω.

The present disclosure provides a process cartridge detachably attached to a main body of an electrophotographic image forming apparatus, wherein the process cartridge comprises:

an electrophotographic photosensitive member; and a charging member arranged so as to be capable of charging the electrophotographic photosensitive member, and the charging member is the electrophotographic member of the present disclosure.

The present disclosure provides an electrophotographic image forming apparatus, comprising: an electrophotographic photosensitive member; and a charging roller arranged so as to be capable of charging the electrophotographic photosensitive member, wherein the charging roller is the electrophotographic member of the present disclosure.

According to at least one aspect of the present disclosure, an electrophotographic member that can form high quality images over a long period of time, even when this member is applied to the electrophotographic image forming process having a longer service life and faster speed, can be provided. Further, according to at least one aspect of the present disclosure, a process cartridge to form high quality electrophotographic images can be provided. Furthermore, according to at least one aspect of the present disclosure, an electrophotographic image forming apparatus that can form high quality electrophotographic images can be provided.

Further features of the present invention will become apparent from the following description of exemplary embodiments with reference to the attached drawings.

DESCRIPTION OF THE EMBODIMENTS

Figure 1A:
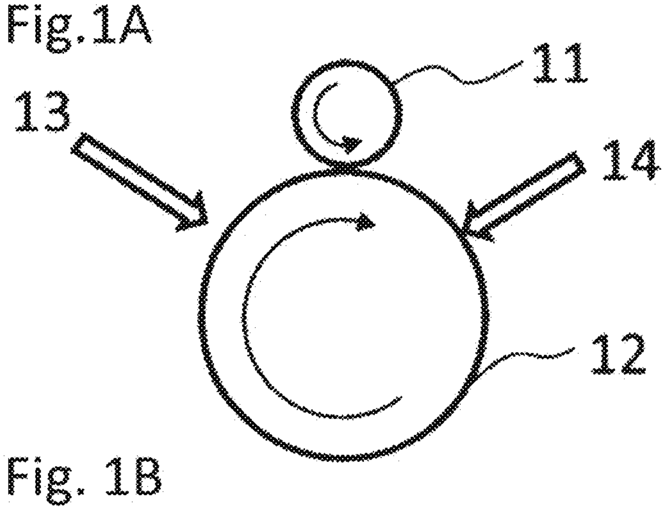
FIGS. 1A to 1C are diagrams for describing the surface potential unevenness.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

Embodiments of the present disclosure will be described in detail with reference to the drawings. Composing elements described in the embodiments, however, are merely examples, and are not intended to limit the scope of the present disclosure thereto.

The present disclosure not only solves the problem of the generation of ghost images, which is a problem to increasing the speed, in the electrophotographic process having a longer service life and faster speed, but also suppresses the generation of white spot images which may be generated in the use of the electrophotographic process over a long period of time.

The present inventors estimated that because of the following reasons, the conductive member according to Japanese Patent Application Publication No. 2020-166210 cannot implement both suppression of the ghost images and suppression of the generation of white spot images in the image forming over a long period of time.

The contaminating substances in this disclosure are toner and external additives which are not transferred to paper or to an intermediate transfer member in the transfer processing of the electrophotographic image forming process, and which remain on the surface of the photosensitive drum, and reach and adhere to the charging member.

The toner and external additives often have insulation properties to hold predetermined charges that are electrostatically transferred from the developing roller to the photosensitive drum in the developing process. The toner and external additives remaining on the surface of the photosensitive drum, without being transferred from the photosensitive drum to the paper and intermediate transfer member, are influenced by discharge at the transfer roller and rubbing with paper before reaching the charging member again, and are charged in a predetermined distribution of positive and negative charges.

The charging member (hereafter also called "charging roller"), on the other hand, is a member that generates a potential difference between the charging member and the surface of the photosensitive drum when DC voltage is applied, in order to discharge electricity to the photosensitive drum. Therefore it is difficult to prevent the adhering of components, of which polarity (negative/positive) is opposite of the polarity of the charging bias which generates the above potential difference, to the charging roller side due to the electrostatic attraction. In other words, for the charging member which should be used over a long period of time, it is demanded to suppress abnormal discharge caused by the contaminating substances, even if the contaminating substances adhere to the charging roller, as described below.

Next, white spot images, which are generated by abnormal discharge due to contaminating substances, will be described. The discharge phenomena is generated between the charging roller and the photosensitive member based on Paschen's law, and the photosensitive member is charged with negative or positive charges in accordance with the applied voltage. The discharge is generated by neutral air that is ionized in the electric field, hence charges having the opposite polarity are also generated at the same time. In other words, the positive or negative charges having opposite polarity of discharge are moved toward the surface of the charging member by the electric field. In a state where no contaminating substances adhere to the surface of the charging roller, the charges on the surface of the charging roller normally leak to the conductive support member side because of the conductivity of the charging roller, even if the surface of the charging roller is charged up with charges having an opposite polarity.

However if contaminating substances (e.g. toner, external additives) having insulation properties adhere to the surface of the charging roller, the charges having opposite polarity of discharge moving toward the surface of the charging member, are trapped on the surface without leaking to the conductive member. Here charges having opposite polarities exist between the contaminating substances charged with opposite polarity of the discharge (charged with the opposite polarity of the voltage applied to the charging member), and the surface of the charging member around the area where the contaminating substances adhere, hence a very strong electric field is generated. This very strong electric field may, in some cases, generate an abnormally strong discharge.

Therefore if the charges, which are charged up due to adhering contaminating substances, can be moved toward the conductive support member side, the abnormally strong charges may not be generated, and accordingly white spot images may not be generated.

Based on the above consideration, the reason why both the suppression of ghost images and the suppression of the generation of white spot images in image formation over a long period of time cannot be implemented in the case of using the conductive member according to Japanese Patent Application Publication No. 2020-166210 as the charging member will be described below.

Figure 1B:
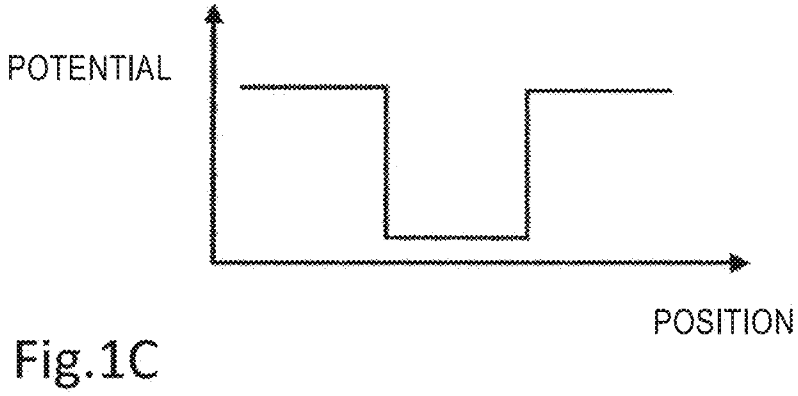
Figure 1C:
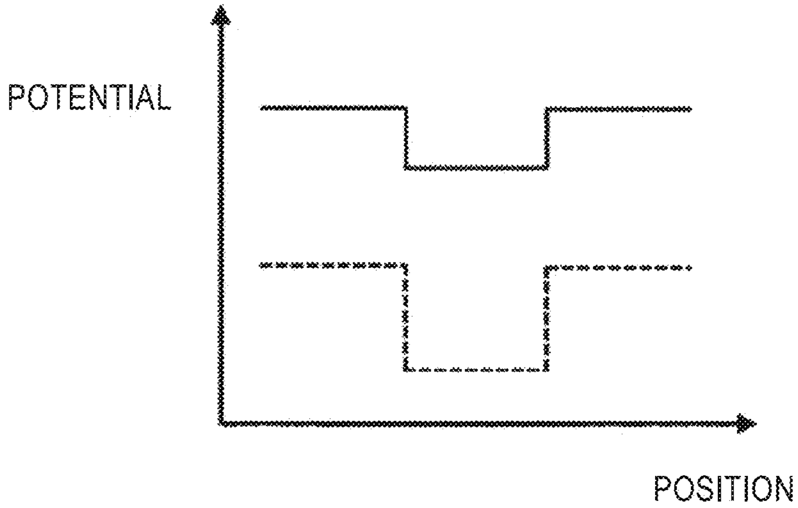

The phenomena of the generation of ghost images will be described with reference to FIGS. 1A to 1C. FIGS. 1A to 1C are diagrams for describing the surface potential unevenness. FIG. 1A is a schematic diagram depicting an electrophotographic process, FIG. 1B is a graph indicting a surface potential on the surface of the photosensitive drum, and FIG. 1C is a graph indicating a charging potential in the case of using the charging member according to Japanese Patent Application Publication No. 2020-166210. In FIG. 1C, the solid line portion indicates the charging potential on the surface of the charging member, and the broken line portion indicates the surface potential on the surface of the photosensitive drum.

Figure 11:
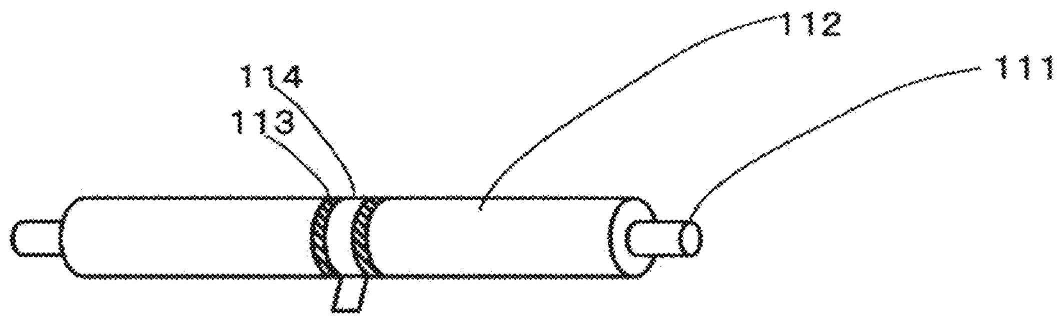
FIG. 11 is a schematic diagram depicting the state where a measurement electrode is formed on a charging roller.

In FIG. 1A, 11 indicates a charging member, 12 indicates a photosensitive drum, 13 indicates a surface potential measuring portion before the charging process, and 14 indicates the surface potential measuring portion after the charging process. Normally the surface potential of the photosensitive drum after the transfer process has unevenness, as indicated in FIG. 1B. Therefore the unevenness of the surface potential enters the charging process, and the charging potential unevenness, as indicated by the solid line in FIG. 1C, is formed according to the above mentioned surface potential unevenness. As a result, a ghost image is generated. Here if the charging member has a charging function sufficient enough to make the surface potential unevenness uniform, a ghost image may not be generated.

The conductive member according to Japanese Patent Application Publication No. 2020-166210 includes a matrix and a plurality of domains dispersed in the matrix, and this domain contains an electronic conductive agent. By electrically separating each domain by an insulating region (matrix), sufficient charges can be more easily stored in the domain. Thereby leaking of discharge is suppressed, and if a single discharge amount is improved at the same time, the generation of a ghost image is more easily suppressed.

However, in Japanese Patent Application Publication No. 2020-166210, if the matrix exists as the insulating region, it is impossible to move the charge, which are charged up in opposite polarity by the discharge to the contaminating substances deposited on the surface of the charging member, toward the conductive support member side. As a result, white spot images are more easily generated in the image formation over a long period of time. In other words, the present inventors estimated that the existence of the matrix as an insulating region suppresses the generation of the ghost images, but is also the cause of generating the white spot images in the image formation over a long period of time.

Therefore the inventors verified that the charge up of the adhering contaminating substances is suppressed by adjusting the volume resistivity of the matrix, and confirmed that if the volume resistivity of the matrix is set to $1.0\times10^{12}$ Ω·cm or less, the charges charged up on the contaminating substances adhering to the charging member can be quickly moved toward the conductive support member side via the matrix, and the generation of the white spot images can be suppressed.

As a consequence, the present inventors recognized that it is not easy to implement both the suppression of the generation of ghost images to support higher speeds, and suppressing the generation of white spot images in the image formation over a long period of time.

Then the present inventors continued intensive studies to obtain an electrophotographic member which implements both the suppression of the generation of ghost images and the suppression of the generation of white spot images. As a result, the present inventors found that the above mentioned requirements can be well satisfied if the conductive layer having a matrix-domain structure includes a domain A that satisfies the following Requirements 1 to 3.

The present disclosure will now be described in detail with reference to the drawings.

Electrophotographic Member

The electrophotographic member includes a support member having a conductive outer surface, and a conductive layer disposed on an outer surface of the support member. The electrophotographic member may be an electrophotographic roller, for example. The electrophotographic member will now be described using an electrophotographic roller as an example.

Figure 3:
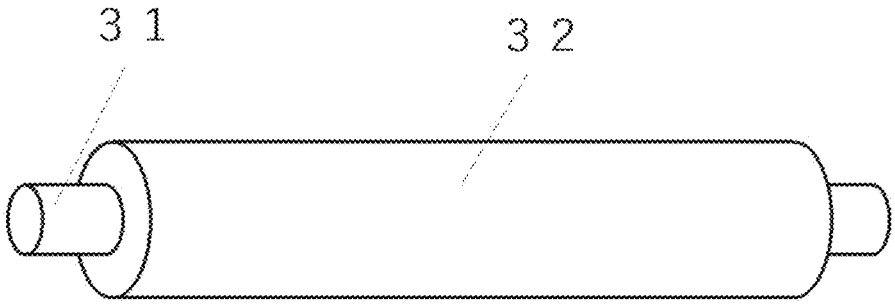
FIG. 3 is a schematic diagram depicting a charging roller.

FIG. 3 is a schematic external view of an electrophotographic roller. This electrophotographic roller includes a conductive layer 32 on an outer periphery of the support member (shaft core) 31. The conductive layer 32 is an elastic layer, for example. Both ends of the support member 31 may be exposed without being coated by the conductive layer 32. The electrophotographic roller may be a charging roller. The charging roller is disposed in the image forming apparatus, as charging means for charging a photosensitive member, and has conductivity.

Support Member

The support member has a conductive outer surface. A material constituting the support member may be selected from materials known in the field of electrophotographic members, and materials that can be used for the electrophotographic members. For example, aluminum, stainless steel, synthetic resin having conductivity, such a metal as iron, and such an alloy as a copper may be used. Further, oxidation and plating treatment using chrome, nickel or the like may be performed thereon.

For the plating, both electric plating and electroless plating may be used. However electroless plating is preferable in terms of dimensional stability. For the types of the electroless plating used here, nickel plating, copper plating, gold plating and many other alloy plating can be used. The thickness of the plating is preferably 0.05 μm or more, and is more preferably 0.1 to 30 μm if the balance of the operation efficiency and the rust prevention capability is considered.

The shape of the support member is not especially limited, but is preferably a cylindrical shape, for example. The cylindrical shape may be a solid cylindrical shape or a hollow cylindrical shape (tubular shape). The outer diameter of the support member is preferable ϕ3 mm to ϕ10 mm.

Conductive Layer

Matrix-Domain Structure

The conductive layer includes a matrix containing a first rubber, and a plurality of domains dispersed in the matrix. In other words, the conductive layer has a matrix-domain structure. In the conductive layer, the domain has a core-shell structure, for example, where an electronic conductive agent (conductive particles), such as carbon black, is filled in the core portion.

Core-Shell Structure of Domain

Figure 2:
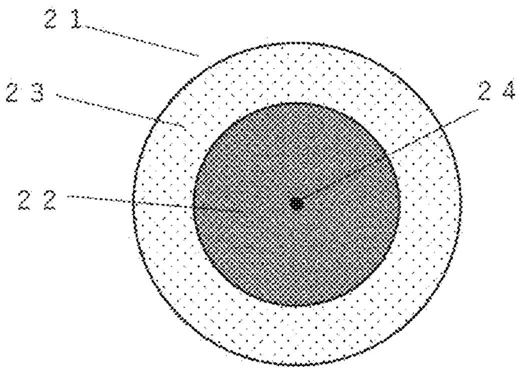
FIG. 2 is a schematic diagram depicting a structure of a domain.

An example of the core-shell structure of a domain 21 is depicted in FIG. 2. FIG. 2 is a cross-sectional view of the domain 21 sectioned at a plane passing through a centroid of the volume 24. In FIG. 2, the domain 21 has a core-shell structure constituted of a core 22 and a shell 23 which surrounds the core 22. In FIG. 2, the amount of the electronic conductive agent is indicated by the density of the shading, which indicates that the amount of the electronic conductive agent is higher as the shading is darker.

The electrophotographic member satisfies the following Requirements (1) to (3).

Requirement (1)

The conductive layer includes a matrix containing a first rubber, and a plurality of domains dispersed in the matrix, and volume resistivity of the matrix is $1.00\times10^{12}$ Ω·cm or less.

Requirement (2)

The plurality of domains dispersed in the matrix includes at least one domain A, and the domain A satisfies the <Condition 1> to <Condition 3> below.

<Condition 1> The domain A contains a second rubber and an electronic conductive agent.

<Condition 2> A centroid of volume of the domain A exists in the domain A.

<Condition 3> On a cross-section of the domain A passing through the centroid of volume, volume resistivity of an outer peripheral region, which is a region of a 100 nm distance from an outer edge of the domain A toward the centroid of volume, is more than $1.00\times10^{12}$ Ω·cm.

Requirement (3)

In a case where a platinum electrode is disposed on an outer surface of the electrophotographic member, and impedance is measured by applying AC voltage having a 1V amplitude between the outer surface of the support member and the platinum electrode in an environment of a 23° C. temperature and a 50% relative humidity, while charging frequency in a range of $1.0\times10^{-2}$ to $1.0\times10^{7}$ Hz, the frequency is plotted on an abscissa and the impedance is plotted on the ordinate of a log-log graph, the following Requirements (3-1) and (3-2) are satisfied.

Requirement (3-1) An slope at a frequency range of $1.0\times10^{5}$ to $1.0\times10^{6}$ Hz is −0.80 to −0.30.

Requirement (3-2) The impedance in a frequency range of $1.0\times10^{-2}$ to $1.0\times10^{1}$ Hz is $1.00\times10^{3}$ to $1.00\times10^{7}$Ω.

Requirements (1) to (3) will be described in detail.

Requirement (1)

By setting the volume resistivity of the matrix to $1.00\times10^{12}$ Ω·cm or less, charges that are charged up on the contaminating substances adhering to the electrophotographic member can be more easily moved toward the support member side. The charged-up charges having opposite polarity of the voltage applied from the support member side, hence the charges are attracted to the electric field, and move toward the support member. Therefore if the volume resistivity of the matrix is set to the above mentioned range, the charged-up charges can more easily move via the matrix. This makes it easier to move the charted-up charges toward the support member side more quickly via the matrix.

The volume resistivity of the matrix is preferably $1.00\times10^{11}$ Ω·cm or less, and is more preferably $1.00\times10^{10}$ Ω·cm or less. The lower limit is not especially limited, but may be $1.00\times10^{-1}$ to $1.00\times10^{12}$ Ω·cm, or $1.00\times10^{0}$ to $1.00\times10^{11}$ Ω·cm, or $1.00\times10^{0}$ to $1.00\times10^{10}$ Ω·cm, for example.

Adjustment Method for Volume Resistivity of Matrix

The volume resistivity of the matrix can be adjusted by the composition of the rubber for forming the matrix (hereafter also called "MRC"). For example, a rubber material in the above mentioned volume resistivity range is used, or the volume resistivity is controlled to the above mentioned range using an additive required for a rubber material having high volume resistivity depending on the need.

For example, a first rubber that can be used for MRC is at least one rubber selected from the group consisting of natural rubber, butadiene rubber, butyl rubber, acrylonitrile-butadiene rubber, urethane rubber, silicon rubber, fluoro rubber, isoprene rubber, chloroprene rubber, styrene-butadiene rubber, ethylene-propylene rubber, polynorbornene rubber and hydrin rubber. Particularly at least one rubber selected from the group consisting of acrylonitrile-butadiene rubber, chloroprene rubber and hydrin rubber is preferable, and at least one rubber selected from the group consisting of acrylonitrile-butadiene rubber and chloroprene rubber is more preferable.

If necessary, the matrix may contain fillers, processing aids, cross-linking agents, cross-linking aids, cross-linking accelerators, cross-linking acceleration aids, cross-linking retarders, antioxidants, softeners, dispersing agents, colorant, or electronic conductive agents. To set the volume resistivity of the matrix to the above mentioned range, it is preferable that the matrix does not contain such electronic conductive agents as carbon black.

Measurement Method for Volume Resistivity of Matrix

To measure the volume resistivity, a predetermined thickness (e.g. 1 μm) of a thin slice containing the matrix-domain structure is cut out from the conductive layer, and a micro-probe of the scanning probe microscope (SPM) or an atomic force microscope (AFM) is contacted to the matrix and domain of the thin slice.

Figure 5A:
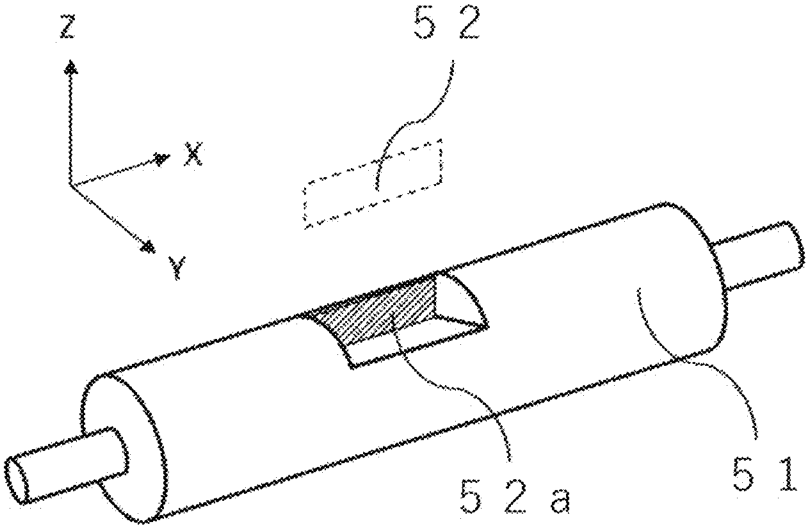
FIGS. 5A and 5B are diagrams for describing a cross-sectional cutout direction.
Figure 5B:
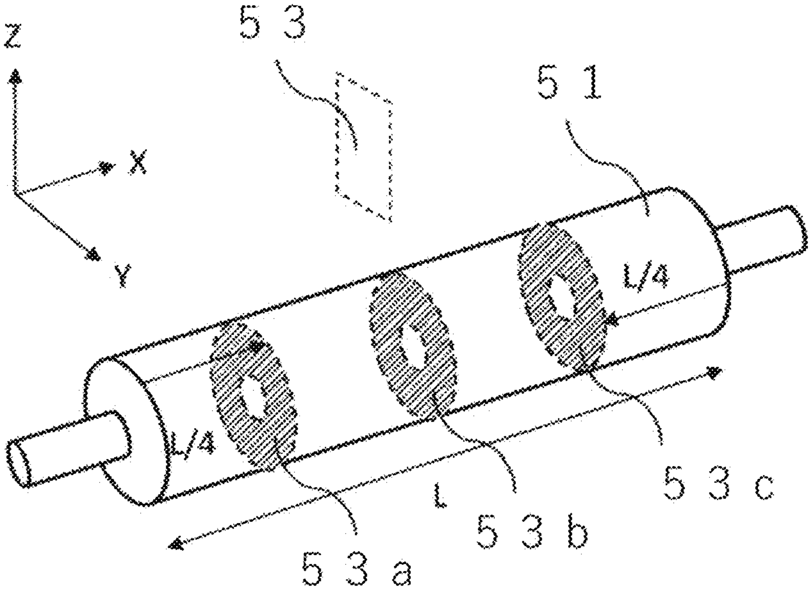

The thin slice is cut out from the conductive layer such that the thin slice includes at least a part of a cross-section 52*a* parallel with the XZ plane, where the X axis is the longitudinal direction of the electrophotographic member 51, the Z axis is the thickness direction of the conductive layer, and the Y axis is the circumferential direction, as illustrated in FIG. 5A, for example. The thin slice may also be cut out such that the thin slice includes at least a part of the YZ plane (e.g. 53*a*, 53*b*, 53*c*) vertical to the axial direction of the conductive member, as illustrated in FIG. 5B. In the present disclosure, the thin slice was cut out as illustrated in FIG. 5B.

Cutting out is performed, for example, with a sharp razor, a microtome, a focusing ion beam (FIB) or the like. In the present disclosure, a microtome was used.

To measure the volume resistivity, one surface of the thin slice, which was cut out from the conductive layer, is grounded. Then the micro-probe of the scanning probe microscope (SPM) or the atomic force microscope (AFM) is contacted to the matrix portion of the surface of the thin slice on the opposite side of the grounded surface, and a 50 V DC voltage is applied for 5 seconds, then an arithmetic average value is calculated from the values when the ground current value is measured for 5 seconds. The electric resistance value is calculated by dividing the applied voltage by this calculated value. Finally, using the film thickness of the thin slice, the resistance value is converted into the volume resistivity. Here the SPM and AFM can measure the film thickness of the thin slice together with the resistance value. The specific procedure will be described later.

Requirement (2)

A plurality of domains include at least one domain A, and the domain A contains an electronic conductive agent, and the volume resistivity of the outer peripheral region of the domain is more than $1.00\times10^{12}$ Ω·cm, thereby domains can be electrically isolated from each other even in a case where the volume resistivity of the matrix is $1.00\times10^{12}$ Ω·cm or less. As a result, a sufficient amount of charges can be stored in the domains, a leaking discharge is suppressed, and the generation of a ghost image can be suppressed.

Domain A

The domain A satisfies the following <Condition 1> to <Condition 3>.

<Condition 1> The domain A contains a second rubber and an electronic conductive agent.

<Condition 2> A centroid of volume of the domain A exists in the domain A.

<Condition 3> On a cross-section of the domain A passing through the centroid of volume, volume resistivity of an outer peripheral region, which is a region of a 100 nm distance from an outer edge of the domain A toward the centroid of volume, is more than $1.00\times10^{12}$ Ω·cm.

The above conditions will be described in detail below.

<Condition 1>

A domain A contains a second rubber and an electronic conductive agent. By containing the second rubber and the electronic conductive agent, the transporting path of charges can be more effectively limited to the path via the domain, while suppressing the movement of purposeless charges in the matrix.

<Condition 2>

Figure 15A:
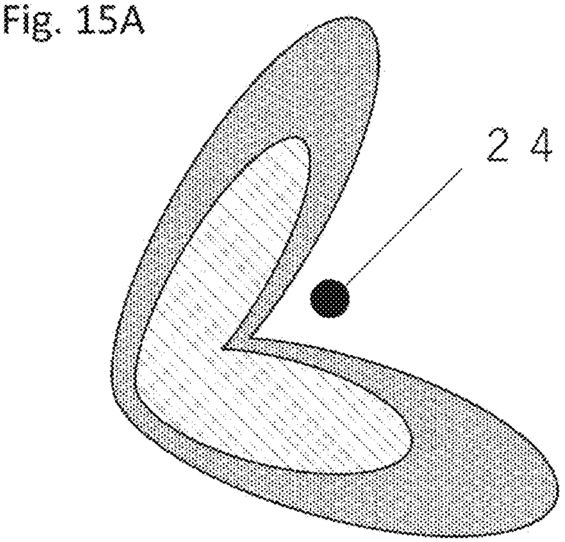
FIGS. 15A and 15B are diagrams for describing a centroid of volume of a domain A.
Figure 15B:
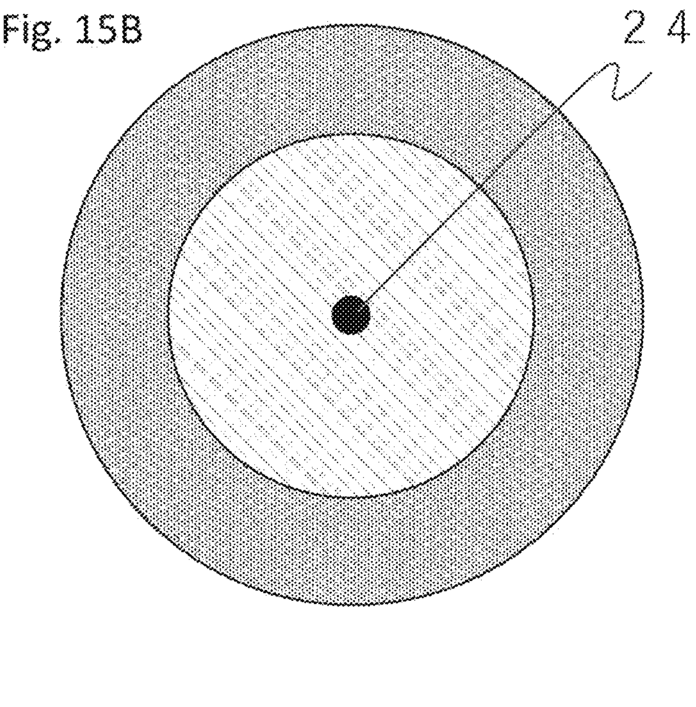

A centroid of volume of the domain A exists in the domain A. The shape of the domain A is preferably a shape close to a sphere. The centroid of volume preferably exists inside the core of the domain A. For example, FIG. 15A indicates a domain where the centroid of volume 24 does not exist inside the domain A, and FIG. 15B indicates a domain where the centroid of volume 24 exists inside the domain. In the case where the centroid of volume of the domain A exists inside the domain A, this means that the domain A has a shape close to a sphere. If the domain A has a shape close to a sphere, an effect of reducing non-uniformity of the electric field between domains can be obtained.

<Condition 3>

On the cross-section of the domain A passing through the centroid of volume, the volume resistivity of an outer peripheral region, which is a region of a 100 nm distance from an outer edge of the domain A to the centroid of volume, is more than $1.00\times10^{12}$ Ω·cm. Thereby inside the domain A and the matrix can be electrically isolated by the outer peripheral region of the domain A. As a result, a sufficient amount of charges can be more easily stored in the domain without leaking charges to the matrix. By decreasing the amount of the electronic conductive agent in the outer peripheral region, the volume resistivity of the outer peripheral region can more easily enter the above mentioned range. To adjust the volume resistivity of the outer peripheral region, a method for making the domain A a core-shell structure and setting the volume resistivity of the shell to be more than $1.00\times10^{12}$ Ω·cm, for example, can be used, as mentioned later.

The volume resistivity of the outer peripheral region is preferably $1.00\times10^{13}$ Ω·cm or more, and is more preferably $8.00\times10^{13}$ Ω·cm or more. The upper limit of the volume resistivity of the outer peripheral region is not especially limited, but may be, for example, more than $1.00\times10^{12}$ Ω·cm and $1.00\times10^{19}$ Ω·cm or less, $1.00\times10^{13}$ Ω·cm or more and $1.00\times10^{18}$ Ω·cm or less, or $8.00\times10^{13}$ Ω·cm or more and $1.00\times10^{18}$ Ω·cm or less.

It is preferable that the domain A that satisfies the above mentioned <Condition 1> to <Condition 3> has a core-shell structure constituted of a core and a shell surrounding the core, for example. It is more preferable that the core includes a second rubber and an electronic conductive agent contained in the second rubber. It is even more preferable that the electronic conductive agent is unevenly distributed to the core. If the domain A has the core-shell structure and the electronic conductive agent is unevenly distributed to the core, <Condition 3> can be more easily satisfied. In other words, the cores can be electrically insulated by the shell, and a sufficient amount of charges can be more easily stored in the domains without leaking charges to the matrix. In the later mentioned confirming method for the matrix-domain structure, it is determined that the domain has the core-shell structure constituted of a core and a shell surrounding the core, if it is confirmed that there is a domain where the core is surrounded by a shell having low content of the electronic conductive agent. The confirmation method for the domain A will be described later.

The domain A may be constituted of one type of rubber material, but is preferably constituted of two types of rubber material.

In at least eight samples out of the cubic samples of which one side is 6 μm and are sampled from nine locations of the conductive layer, the higher the ratio of the number of domains A, with respect to a total number of plurality of domains, the better. If the ratio of the number of domains A is higher, the movement of purposeless charges in the matrix can be more easily suppressed. Specifically, the ratio may be 27 quantity % or more, and is preferably more than 50 quantity %, and is even more preferably 80 quantity % or more. The upper limit is not especially limited, but may be 27 quantity % or more and 100 quantity % or less, more than 50 quantity % and 95 quantity % or less, or 80 quantity % or more and 90 quantity % or less.

In the case of increasing the ratio of the domain A using two types of rubbers, the second rubber and the first rubber are kneaded into a cured second rubber in which the electronic conductive agent and a vulcanizing agent are added to the second rubber used as a core and mixed by a pressure kneader. This makes it easier to unevenly distribute the second rubber to the outer peripheral region of the domain A, and increase the domains A. In the case of using the third rubber, in addition to the above means, the electronic conductive agent is mixed with the second rubber using a pressure kneader, and is master-batched, further, the first rubber and the third rubber are mixed and master-batched thereby. By mixing these master batches, the number of domains having a structure of the domain A can be increased.

The second rubber used for the core and the third rubber used for the shell may be constituted of a same rubber material. In this case, in the step of preparing the rubber composition for forming the core (hereafter also called "CMB"), which is described later, the temperature during kneading the second rubber and the electronic conductive agent is set to C (° C.), and in the step of preparing the rubber composition for forming the matrix and the shell (hereafter also called "MSC"), which is described later, the temperature during kneading the first rubber and the third rubber is set to D (° C.), such that the temperature C is higher than the temperature D. Here the difference between the temperature C and the temperature D, which indicates difference in temperature, is preferably 20° C. or more, is more preferably 30° C. or more, and is even more preferably 40° C. or more. By setting the temperature C to be higher than the temperature D, the amount of gel containing the electronic conductive agent can be increased during kneading the second rubber and the electronic conductive agent. As a result, the electronic conductive agent is maintained in the second rubber, even in the later mentioned step of preparing the rubber composition for forming the conductive layer, and movement of the electronic conductive agent between the second rubber and the third rubber can be suppressed.

The value of the temperature C is not especially limited as long as the value does not exceed a temperature that causes deterioration of rubber during kneading, and may be, for example, 110 to 170° C., 120 to 160° C. or 120 to 150° C. In these ranges, the amount of gel containing the electronic conductive agent can be easily increased. It is also preferable that the temperature of CMB, in the step of preparing the rubber composition for forming the conductive layer (kneading step) is 110 to 170° C., 120 to 160° C. or 120 to 150° C.

The value of the temperature D is not especially limited, and may be, for example, 80 to 120° C. or 90 to 110° C. It is also preferable that the temperature of MSC, in the step of preparing the rubber composition for forming the conductive layer (kneading step), is 80 to 120° C. or 90 to 110° C.

To dispose the centroid of gravity of the domain inside the domain, a method for uniformly forming the domains A by increasing the kneading time in the step of forming the domains (step (iii)), or by strengthening the shearing strength during the kneading, may be used.

Matrix Domain Structure, Confirming Domains a, Measuring Ratio of Number of Domains a to Total Number of Domains In the present disclosure, the matrix-domain structure, conforming domains A, and a ratio of a number of domains A to the total number of domains can be determined by measuring the conductive layer three-dimensionally using FIB-SEM.

The FIB-SEM is a method of processing a sample using a focused ion beam (FIB), and observing an exposed cross-section using a scanning electron microscope (SEM). To examine a three-dimensional structure, many images are acquired by repeating processing and observing consecutively, and then theses SEM images are three-dimensionally reconstructed by computer-based software, so that the sample structure is constructed as a three-dimensional stereoscopic image.

Figure 4:
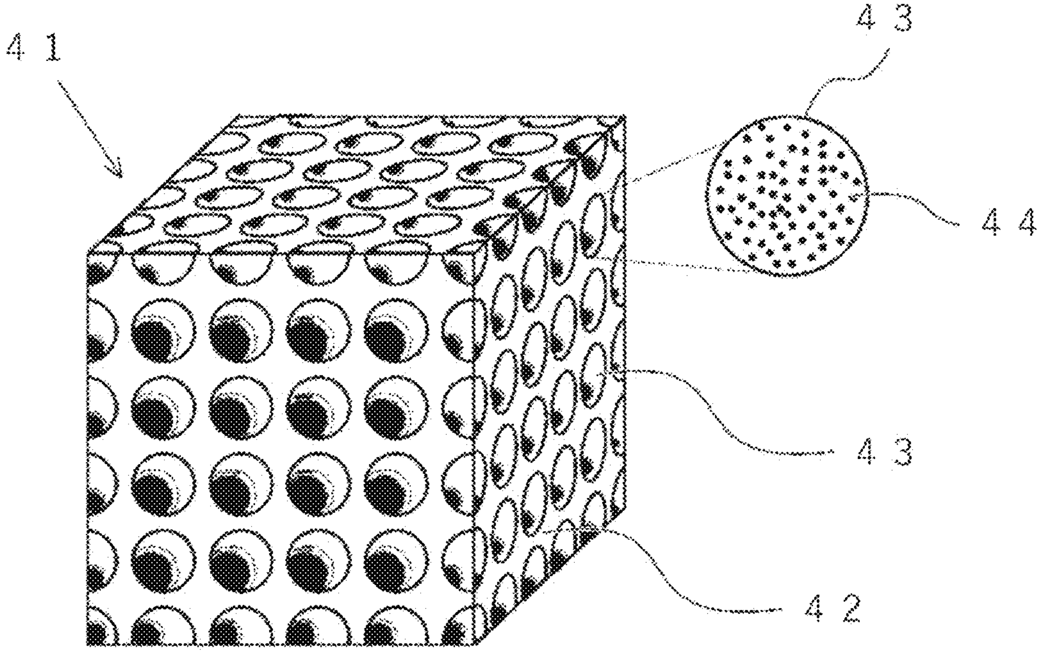
FIG. 4 is a schematic diagram for describing a structure of a conductive layer.

A specific measuring method for a ratio of domains A to the total number of domains is acquiring a three-dimensional stereoscope image, as indicated in FIG. 4, using FIB-SEM (made by FEI Co.), and the above configuration is confirmed in this image. In FIG. 4, 41 indicates a unit cube, 42 indicates a matrix, 43 indicates a domain, and 44 indicates a conductive particle.

In other words, sampling is performed from nine locations of the conductive layer. The nine locations should not be positioned arbitrarily, but should be at equal intervals, for example. Although depending on the shape of the conductive layer, if the conductive layer can be equally divided into nine, sampling is performed from the center portion of each portion of the nine divided regions.

In the case where the electrophotographic member is a roller shape, and the length in the axial direction (longitudinal direction) is L, the positions are determined to three locations, every 120° in the circumferential direction of the roller ((¼))L, (2/4)L, (¾)L) from the edge, and one sample is cut out from each location respectively.

Then the three-dimensional measurement is performed using FIB-SEM, so as to measure the cubic-shaped images, of which one side is 6 μm, at 60 nm intervals. Here on each cross-section of (¼)L, (2/4)L and (¾)L, the cross-section of the conductive layer is measured at the center portion between the core metal position and the surface, in the circumferential direction of the roller at every 120°.

To appropriately observe the domain structure, pre-treatment is performed so that good contrast of the domain and the matrix can be obtained. Here dye treatment may be performed. Specifically, a dyeing agent to identify the first rubber and the second rubber respectively, such as osmium tetroxide, ruthenium tetroxide or phosphotungstic acid may be selected. In the later mentioned examples, osmium tetroxide is used for dyeing. The types of rubber can be determined and the domain and the matrix can be distinguished thereby, since the dyeing progresses more as the amount of double bonds and benzine rings of the rubber is higher.

In the case where a plurality of domains are dispersed in the matrix and the matrix has a communicating structure, it is determined that the matrix-domain structure is observed. It is also possible to easily determine whether the second rubber and the electronic conductive agent are contained, based on the backscattered electron image of the image captured by FIB-SEM. Further, in the case where the matrix-domain structure is observed in at least eight of the nine samples, it is determined that the conductive layer has the matrix-domain structure.

The obtained image is analyzed using the 3D visualization analysis software Avizo (registered trademark, made by FEI Co.). Here the domains and the matrix are binarized and image analysis is performed.

Then the total number of domains and the number of domains A included in one cubic-shaped sample (one side: 6 μm) are counted. This step is performed for nine samples, and a ratio of a number of domains A to the total number of domains in each sample is calculated.

As mentioned above, the electronic conductive agent contained in the outer peripheral region tends to be low. Therefore a domain, in which a region where the content of the electronic conductive agent is low exists around the core containing the electronic conductive agent, is regarded as satisfying <Condition 3> and can be determined as the domain A. Further, if the electronic conductive agent is contained in the domain, it is determined that <Condition 1> is satisfied, and if the shape of the domain is close to a sphere, it is determined that <Condition 2> is satisfied. Then a domain satisfying <Condition 1> to <Condition 3> may be determined as the domain A.

In the case where the domain A has a core-shell structure, the volume resistivity of the shell is preferably more than $1.00\times10^{12}$ Ω·cm. Thereby <Condition 3> can be more easily satisfied. In other words, this can more easily prevent the state in which charges leak into and move in the matrix, resulting as if a conductive path were created inside the conductive layer. The volume resistivity of the shell is preferably $1.00\times10^{13}$ Ω·cm or more, and is more preferably $8.00\times10^{13}$ Ω·cm or more. The upper limit of the volume resistivity of the shell is not especially limited, but may be more than $1.00\times10^{12}$ Ω·cm and $1.00\times10^{19}$ Ω·cm or less, $1.00\times10^{13}$ Ω·cm or more and $1.00\times10^{18}$ Ω·cm or less, or $8.00\times10^{13}$ Ω·cm or more and $1.00\times10^{18}$ Ω·cm or less, for example.

The volume resistivity of the shell is determined by the composition of the shell. It is preferable that the shell contains a third rubber. For the third rubber, it is preferable to use a rubber material having high volume resistivity in order to electrically insulate the core. For example, a rubber that can be used for the third rubber is at least one rubber selected from the group consisting of natural rubber, butadiene rubber, butyl rubber, acrylonitrile-butadiene rubber, urethane rubber, silicon rubber, fluoro rubber, isoprene rubber, chloroprene rubber, styrene-butadiene rubber, ethylene-propylene rubber, ethylene-propylene-diene rubber and polynorbornene rubber. Particularly at least one rubber selected from the group consisting of: natural rubber, butadiene rubber, butyl rubber, isoprene rubber, styrene-butadiene rubber and ethylene propylene rubber is preferable, and at least one rubber selected from a group of: butadiene rubber, butyl rubber, isoprene rubber, styrene-butadiene rubber and ethylene-propylene-diene rubber is more preferable. The third rubber may be different from or the same as the second rubber, but is preferably different from the second rubber. If the third rubber and the second rubber are different, the phase separation between the core and the shell is easier, and the core-shell structure can be easily formed.

If necessary, the shell may contain fillers, processing aids, cross-linking agents, cross-linking aids, cross-linking accelerators, cross-linking acceleration aids, cross-linking retarders, antioxidants, softeners, dispersing agents or coloring agents. To set the volume resistivity of the shell to the above mentioned range, it is preferable that the shell does not contain such electronic conductive agents as carbon black.

Measurement Method for Volume Resistivity of Outer Peripheral Region of Domain A To measure the volume resistivity of the outer peripheral region of the domain A, the volume resistivity is measured every time a plurality of cross-sections are obtained by FIB-SEM. Then the centroid of volume is determined based on the three-dimensional image, and a measurement cross-section which includes the centroid of volume is specified, and the volume resistivity of this measurement cross-section is determined.

Specifically, the domain is sectioned by the FIB-SEM at 60 nm intervals, and every time a plurality of cross-sections are obtained, the volume resistivity of the domain A, existing in the cross-sections, is measured in the same manner as the method for measuring the volume resistivity of the matrix. Then the centroid of volume of the domain is calculated using an image analyzing apparatus (product name: LUZEX-AP, made by Nireco Corp.), whereby the measurement cross-section which includes the centroid of volume is specified. Further, the volume resistivity is measured for the outer peripheral region of the domain of this measurement cross-section, in the same manner as the method for measuring the volume resistivity of the matrix. The same steps of forming cross-sections and measuring the volume resistivity are repeated until the entire domain is sectioned.

The centroid of volume is calculated for the three-dimensional image obtained by FTB-SEM using the image analyzing apparatus (product name: LUZEX-AP, made by Nireco Corp.), and it is analyzed whether the centroid of volume exists inside the domain. If the domain is the domain A, the volume resistivity of the outer peripheral region of the domain in the cross-section closest to the centroid of volume of the domain is regarded as the volume resistivity of the outer peripheral region of the domain A.

Thickness of Shell

The thinner the thickness of the shell the better since the charge amount stored in the domain A increases, as indicated in the following Expression (1).

$$C = \varepsilon\frac{S}{d} \qquad (1)$$

In Expression (1), d indicates the thickness of the shell, S indicates the surface area of the shell, C indicates the capacitance of the shell, and F indicates the dielectric constant of the shell. As expressed in Expression (1), the capacitance C of the shell increases as d is smaller. This results in an increase in the charge amount stored in the domain A, which is preferable.

Specifically, the thickness of the shell is preferably 1.00 μm or less, is more preferably 0.70 μm or less, and is ideally 0.50 μm or less. However to suppress leaking charges to the matrix by isolating domains from each other with certainty by insulating regions, the thickness of the shell is preferably 0.10 μm or more, and is ideally 0.20 μm or more. In other words, the thickness of the shell may be, for example, 0.10 to 1.00 μm, 0.10 to 0.70 μm, or 0.20 to 0.50 μm.

Measuring Method for Thickness of Shell

The measuring method for the thickness of the shell is the same as the measuring method for volume resistivity of the outer peripheral region of the domain A, except that the thickness of the shell in each cross-section is measured instead of measuring the volume resistivity in each cross-section.

To make observation of the matrix-domain structure easier, a pre-treatment, to obtain a clear contrast of the core and the shell, is performed. Specifically, osmium tetroxide, ruthenium tetroxide, phosphotungstic acid or the like can be used, and dyeing agents to identify the second rubber and the third rubber respectively can be appropriately selected. In the later mentioned examples, osmium tetroxide is used for dyeing. Since dyeing processes more as the amounts of double bonds and benzene rings of the rubber are higher, the type of rubber is determined and the core and the shell are distinguished thereby.

The slice, after forming the fracture surface and performing pre-treatment, is observed by a scanning electron microscope (SEM) or a transmission electron microscope (TEM), and the presence of the matrix-domain structure is confirmed. For example, by observing at a 1000 times to 100000 time magnification using the SEM, quantification of the surface area of the domain becomes accurate.

The thickness of the shell is measured by quantifying the captured image of the fracture surface where the matrix-domain structure is captured. The image of the fracture surface obtained by observing with the SEM is converted into an 8-bit grayscale image using the image analyzing apparatus (product name: LUZEX-AP (made by Nireco Corp.)), whereby a 256 gradation monochrome image is obtained. Then the white and black of the image is inverted so that the shell on the fracture surface becomes white, and binarization processing is performed.

The thickness of the shell is calculated as the thickness of the thinnest portion of the shell forming one domain.

In the case of the cylindrical electrophotographic member, where the length of the conductive layer in the longitudinal direction is L and the thickness of the conductive layer is T, cross-sections in the thickness direction of the conductive layer, as indicated in FIG. 5B, are obtained at three locations (center of the conductive layer in the longitudinal direction, and locations at L/4 from both ends of the conductive layer toward the center). For each of the obtained cross-sections, an observation region of 15 μm square is disposed at three locations (0.2 T, 0.5 T and 0.7 T) in the thickness region from the outer surface of the conductive layer toward the support member at a depth of 0.1 T to 0.9 T, and the thickness of each shell observed in the observation regions at the nine locations is measured.

The slice is cut out in a direction that allows observing the cross-section which includes a normal line starting from the center axis of the support member, since the surface, including the support member to the outer surface of the conductive layer (charge moving direction), needs to be observed.

Requirement (3-1)

Figure 6:
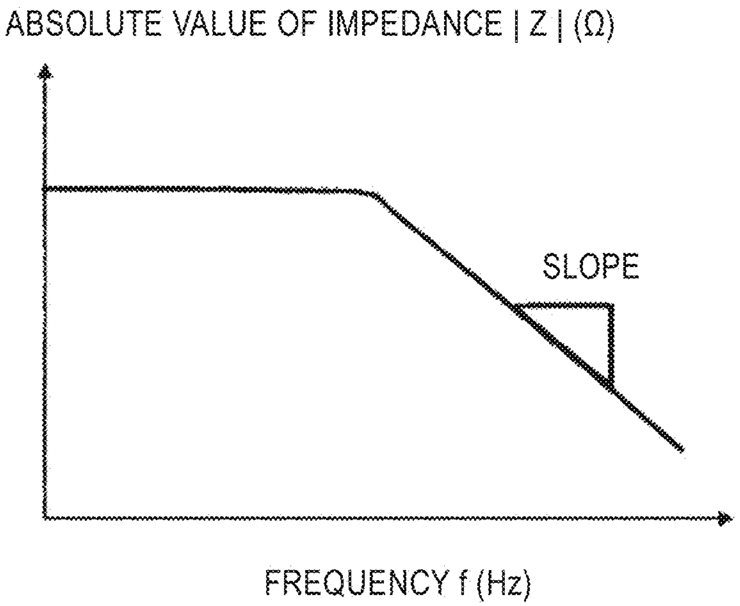
FIG. 6 is a graph indicating impedance characteristics.

That fact that an slope in the frequency range of $1.0\times10^5$ to $1.0\times10^6$ Hz, when the frequency is plotted on an abscissa and the impedance is plotted on an ordinate in a log-log graph (hereafter also called "slope of impedance"), is –0.80 to –0.30, indicates that a stagnation of charges is not generated very much in the electrophotographic member on the high frequency side. If impedance of a conventional electrophotographic member is measured and the absolute value of the impedance of the electrophotographic member is plotted on the ordinate and the frequency is plotted on the abscissa in the log-log graph, the slope always becomes −1 on the high frequency side. Here, as indicated in FIG. 6, the "slope" means the slope with respect to the abscissa when the absolute value of the impedance of the electrophotographic member is plotted on the ordinate and the frequency is plotted on the abscissa in the log-log graph. An equivalent circuit of the electrophotographic member is expressed by a parallel circuit of the electric resistance R and a capacitance C, and the absolute value |Z| of the impedance can be expressed by the following Expression (2). Here "f" in Expression (2) indicates the frequency.

$$|Z| = \sqrt{\frac{1}{R^{-2} + (2\pi f)^2 C^2}} \tag{2}$$

The reason why the high frequency side becomes a line in which the slope is −1 is probably as follows. If the movement of charges cannot follow the high frequency voltage, the charges stagnate. Therefore, it can be inferred that the state where the electric resistance R is increased to be very high, in other words, the insulated capacitance is measured. The state where charges stagnate is assumed to be a state where R is approximated to infinity, in Expression (2). Here in Expression (3), which is the expression when the element of the denominator in Expression (2) is extracted, $R^{-2}$ can be approximated to be a very small value with respect to $(2\pi f)^2C^2$. Therefore Expression (2) can be transformed to Expression (4) generated by removing $R^{-2}$ based on the approximation. Finally Expression (4) is transformed so that both sides become logarithms, whereby Expression (5) is established, and the slope of log f becomes −1.

$$R^{-2} + (2\pi f)^2 C^2 \tag{3}$$

-continued $$|Z| = \sqrt{\frac{1}{(2\pi f)^2 C^2}} \tag{4}$$

$$\log|Z| = -\log f - \log(2\pi C) \tag{5}$$

Figure 7:
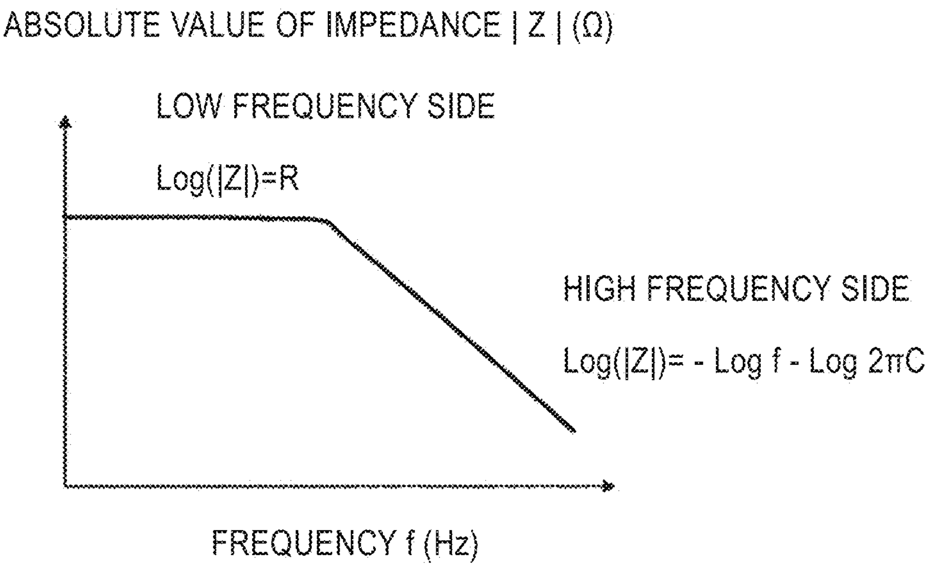
FIG. 7 is a graph for describing behavior of impedance.

The meaning of Expressions (2) to (5) will be described with reference to FIG. 7. In FIG. 7, the ordinate indicates a logarithm of the absolute value of the impedance, and the abscissa indicates a logarithm of the frequency of the measured oscillating voltage. FIG. 7 indicates a behavior of impedance expressed by Expression (2). As described above, the impedance that satisfies Expression (2) drops at a certain frequency as the frequency increases. This dropping behavior, in the log-log plot in FIG. 7, generates a line of which slope is −1, without the slope depending on the electric resistance value and the capacitance of the electronic photographic member, as expressed in Expression (5).

When the impedance characteristic of the electrophotographic member having insulating properties is measured, the line, of which slope is −1, is generated, hence it is presumed that the state of generating a line, of which slope is −1 in the measurement for impedance of the electrophotographic member, indicates the state where the characteristic that the movement of charges stagnates on the high frequency side is expressed. If the movement of charges stagnates on the high frequency side, the supply of charges for discharge cannot follow the frequency of discharge. As a result, it is assumed that a timing at which discharging is disabled is generated, and the discharge is leaking.

On the other hand, in the conductive member whose the slope of impedance is –0.80 to –0.30 in the high frequency region of $1.0\times10^5$ to $1.0\times10^6$ Hz, the supply of charges is less likely to stagnate on the high frequency side. In this case, charges can be supplied when discharge is generated on the high frequency side where charges tend to stagnate easily. Since charges can be supplied smoothly, the leaking of discharge can be suppressed, and the total amount of the discharge can be improved. This range of the high frequency region seems to be a region where the leaking of discharge is easily generated, probably because this is a region where the frequency is highest among the frequencies of discharge generated from the electrophotographic member. If the slope is in the above mentioned range, which is larger than −1, in this frequency region, an slope larger than −1 can be obtained even in the high frequency region that is lower than this frequency region, and the generation of leaking of discharge can be suppressed, and the total amount of discharge can be improved.

The slope of impedance in a region where the frequency is $1.0\times10^5$ Hz to $1.0\times10^6$ Hz is preferably –0.72 to –0.35, and is more preferably –0.72 to –0.55.

The inventors think that the frequency of discharge in a case of using the combination of the charging roller as the electrophotographic member and the photosensitive drum will be in the following range.

A discharge region in the moving direction of the surface of the charging roller, which is disposed to face the outer surface of the photosensitive drum and rotates synchronizing with the photosensitive drum, is set to 0.5 mm to 1 mm. If the process speed of the electrophotographic apparatus is 100 to 500 mm/sec at the maximum, then the time for the surface of the photosensitive drum to pass the discharge region is $10^{-3}$ sec to $10^{-2}$ sec or more. In a detailed observation of discharge, the length of the discharge region by a single discharge is 0.01 mm to 0.1 mm, hence it is presumed that discharge is generated at least 5 to 100 times, while a certain point on the surface of the charging roller passes the discharge region. Therefore the frequency of the discharge generated by the charging roller is estimated to be in a several Hz to $1.0\times10^{6}$ Hz range. As the process becomes faster, the frequency of discharge must be increased so as to increase a number of times of discharge, hence even in the above range, control of discharge and the conductive mechanism, particularly in the $1.0\times10^{5}$ Hz to $1.0\times10^{6}$ Hz high frequency region, is critical.

As mentioned above, in order to increase the number of times of discharge, it is effective to make the slope of the impedance in the high frequency region to deviate from −1. This can allow for better achievement of the characteristics in which the discharge and the supply of charges for the next discharge are quickly done. Deviation of the slope of the impedance from −1 means that the supply of charges in the electrophotographic member is not stagnated, hence this electrophotographic member can implement characteristics to suppress the leaking of discharge.

Requirement (3-2)

The fact that the impedance (hereafter also called "low frequency impedance") in the frequency range of $1.0\times10^{-2}$ to $1.0\times10^{1}$ Hz is $1.00\times10^{3}$ to $1.00\times10^{7}\Omega$ indicates that the stagnation of charges is less likely to occur on the low frequency side. As mentioned above, the absolute value $|Z|$ of the impedance can be expressed by the above Expression (2). In Expression (2), if the frequency is approximated to zero, the absolute value of the impedance is approximated to the electric resistance R, and the electric resistance R indicates the electric resistance when charges move in a single direction. Therefore measuring the impedance while applying a low frequency voltage is probably like simulating an impedance based on the moving amount of the charges in the state where the movement of the charges can follow the oscillation of the voltage.

In other words, the low frequency impedance is an index of how easily charges move between the electrophotographic member and the measurement electrode, and is also an index of the charge amount that can be moved by discharge from the surface of the electrophotographic member to the photosensitive drum.

The amplitude of the AC voltage used for measuring impedance according to Requirement (3-1) and Requirement (3-2) is 1V. This AC voltage for measurement is much lower than the voltage actually applied to the electrophotographic member in the electrophotographic image forming apparatus (which is several hundred to several thousand V). Therefore by measuring the impedance according to Requirement (3-1) and Requirement (3-2), the ease of discharge generated from the surface of the electrophotographic member can be evaluated at a high dimension.

Further, by satisfying Requirement (3-2), the ease of discharge can be controlled to an appropriate range. If the impedance is lower than $1.00\times10^{3}\Omega$, the amount of one discharge step becomes too large, and the supply of charges for the next discharge step cannot keep pace. As a result, the leaking of discharge tends to occur, which makes it difficult to suppress ghost images. If the impedance exceeds $1.00\times10^{7}$ Q, on the other hand, the ease of discharge drops, and the discharge amount does not reach the level required for filling the surface potential unevenness.

The low frequency impedance is preferably $2.00\times10^{3}$ to $1.00\times10^{6}\Omega$, and is preferably $2.00\times10^{3}$ to $1.00\times10^{5}\Omega$.

As described in FIG. 7, in the electrophotographic member, the absolute value of impedance becomes a constant value in the low frequency region. Therefore the impedance in the $1.0\times10^{-2}$ to $1.0\times10^{1}$ Hz range can be substituted with a value of impedance at 1 Hz frequency, for example.

The electrophotographic member that satisfies both Requirement (3-1) and Requirement (3-2) can obtain a discharge amount at a level of eliminating the unevenness of the surface potential of the photosensitive drum, and suppressing the ghost images in the frequency regions from the low frequency side to the high frequency side. Furthermore, by satisfying Requirement (3-1), the leaking of discharge on the high frequency side can be suppressed. By satisfying Requirement (3-2), the discharge performance is further improved, and the generation of ghost images can be effectively suppressed.

Measuring Method for Impedance

Impedance can be measured by the following method.

When impedance is measured, the influence of contact resistance between the electrophotographic member and the measurement electrode must be eliminated. Therefore a low resistance thin film is deposited on the surface of the electrophotographic member, and this thin film is used as an electrode. On the other hand, a conductive support member is used as a ground electrode, and impedance is measured using these two terminals.

To form the thin film, an electrode forming method, such as metal deposition, splattering, metal paste coating, and attaching a metal tape, can be used. In the present disclosure, a platinum thin film is deposited as a platinum electrode, in order to decrease the contact resistance with the electrophotographic member.

In the case of forming the platinum electrode on the surface of the electrophotographic member, it is preferable to attach a mechanism to hold the electrophotographic member to the vacuum deposition apparatus, in terms of simplicity and making the thin film uniform. For an electrophotographic member of which cross-section is circular, it is preferable to use a vacuum deposition apparatus to which a rotating mechanism is further included. For example, in a case of a cylindrical electrophotographic member of which cross-section is a curved surface (e.g. circular), it is preferable to use the following method, since connection of the platinum electrode (measurement electrode) and the impedance measuring apparatus is difficult.

Specifically, after forming a platinum electrode (10 mm to 20 mm width) in the longitudinal direction of the electrophotographic member, a metal sheet is wound around it without a gap, and this metal sheet and the measurement electrode, exposed from the measuring apparatus, are connected, and impedance is measured. Thereby electric signals from the conductive layer of the electrophotographic member can be smoothly acquired by the measuring apparatus, and impedance measurement can be performed. The metal sheet may be made of any metal of which electric resistance value is similar to the metal portion of the connection cable of the measuring apparatus when impedance is measured, and aluminum foil, metal tape or the like can be used.

The impedance measuring apparatus may be any apparatus that can measure impedance up to the $1.0\times10^{7}$ Hz frequency region, such as an impedance analyzer, a network analyzer, and a spectrum analyzer. In terms of the electric resistance range of the electrophotographic member, measurement by the impedance analyzer is preferable.

The impedance measurement conditions will be described. Using the impedance measuring apparatus, impedance in the frequency region of $1.0\times10^{-2}$ to $1.0\times10^{7}$ Hz is measured. Measurement is performed under an environment of a 23° C. temperature and a 50% relative humidity. To decrease measurement dispersion, five measuring points are set for each digit of frequency. The positions of the five measuring points are selected at equal intervals, for example, so as not to be arbitrary. In the case where the electrophotographic member can be equally divided into five parts, a measuring point is disposed at the center portion of each of the five divided regions, although this may depend on the shape of the electrophotographic member. The amplitude of the AC voltage is 1V.

The measurement voltage may be measured while applying DC voltage while considering the sharing voltage applied to the electrophotographic member inside the electrophotographic apparatus. Particularly, measurement while superimposing a DC voltage of 10 V or less with an AC voltage is preferable for quantifying the characteristics of transporting and storing charges.

A method for calculating the slope of impedance will be described next. For the result of measurement under the above mentioned conditions, the absolute value of impedance is plotted with respect to the measuring frequency in the log-log graph, using spreadsheet software (e.g. "Microsoft Excel (product name)" (made by Microsoft Corp.). In the graph obtained by this log-log plot, the slope of impedance in the $1.0\times10^{5}$ to $1.0\times10^{6}$ Hz frequency region is determined using the measuring points in the $1.0\times10^{5}$ to $1.0\times10^{6}$ Hz frequency region.

Specifically, in the plot in this frequency range, an approximate line of the linear function is calculated by the least square method, and the slope of the determined approximate line is calculated. Then the arithmetic average value of the values at the measuring points in the $1.0\times10^{-2}$ to $1.0\times10^{1}$ Hz frequency region in this log-log graph is calculated, and the obtained value is regarded as the impedance on the low frequency side.

In the case of measuring the slope of impedance in the cylindrical electrophotographic member, the electrophotographic member is equally divided into five regions in the longitudinal direction (axial direction), and measurement is performed at five locations, which are the center portions of the five regions respectively, and an arithmetic average of the measured values of slope at the five locations is calculated.

It is preferable that the electrophotographic member satisfies the following Configuration (1). It is also preferable that the electrophotographic member satisfies the following Configuration (2). It is more preferable that the electrophotographic member satisfies the following Configurations (1) and (2). Thereby the electrophotographic member can easily satisfy the above mentioned Requirement (3).

Configuration (1) The volume resistivity of the core is $1.00\times10^{1}$ to $1.00\times10^{4}$ Ω·cm.

Configuration (2) The arithmetic average value Dm of the distances between the cores is 0.20 to 2.00 μm.

Configuration (1)

The volume resistivity of the core is preferably $1.00\times10^{1}$ to $1.00\times10^{4}$ Ω·cm. By setting the volume resistivity of the core to a lower state, the transporting path of the charges can be more effectively limited to the path via the domain, while suppressing the movement of purposeless charges in the matrix.

Further, the volume resistivity of the core is more preferably $1.00\times10^{2}$ Ω·cm or less. By lowering the volume resistivity of the core down to this range, the amount of charges that move inside the domain can be dramatically increased, hence the impedance of the conductive layer in the frequency range of $1.0\times10^{-2}$ to $1.0\times10^{1}$ Hz can be more easily controlled to an even lower range, such as $1.00\times10^{5}$ Ω·cm or less. As a result, the transporting path of the charges can be more effectively limited to the path via the domain. In other words, the volume resistivity of the core is ideally $1.00\times10^{1}$ to $1.00\times10^{2}$ Ω·cm. The volume resistivity of the core can be adjusted by the electronic conducive agent contained in the core, so that the conductivity of the electronic conducive agent becomes a predetermined value. Specifically, this adjustment can be performed by appropriately selecting a type of electronic conductive agent and an amount of the electronic conductive agent to add.

The electronic conductive agent that is used for controlling the volume resistivity of the core to $1.00\times10^{1}$ to $1.00\times10^{4}$ Ω·cm is not especially limited, but preferably is an electronic conducive agent that can largely change the volume resistivity from high resistance to low resistance by the amount to be dispersed.

Examples of the electronic conductive agent blended with the core is carbon black, graphite, oxide (e.g. titanium oxide, tin oxide), metal (e.g. Cu, Ag), or particles which are coated with oxide or metal on the surface to be conductive. If necessary, two or more types of these conductive agents may be blended at an appropriate ratio. The electronic conductive agent preferably contains carbon black or tin oxide.

Among the above mentioned electronic conductive agents, it is preferable to use a conductive carbon black, since the affinity to rubber is high and the distance between particles of the electronic conductive agent can be easily controlled. The type of carbon black to blend into the domain is not especially limited. For example, gas furnace black, oil furnace black, thermal black, lamp black, acetylene black, ketjen black and the like may be used.

Particularly the conductive carbon black of which DBP oil absorption is 40 $cm^{3}$/100 g to 170 $cm^{3}$/100 g is preferable, since high conductivity can be provided to the core.

The content of the electronic conductive agent, such as conductive carbon black, is preferably from 20 parts by mass to 150 parts by mass when the second rubber contained in the core is 100 parts by mass. The content is even more preferably from 50 parts by mass to 100 parts by mass.

The volume resistivity of the core can be adjusted by the content of the electronic conductive agent in the core. For example, in the case of using a conductive carbon black of which DBP oil absorption is 40 $cm^{3}$/100 g to 170 $cm^{3}$/100 g as the electronic conductive agent, the content of the electronic conductive agent in the core is preferable from 40 mass % to 200 mass % with respect to the total mass of the core.

It is preferable that a large amount of the conductive agent is blended compared with the case of the conductive agent used for a general electrophotographic member. Thereby the volume resistivity at the core can be controlled more easily to a desired range. If necessary, the core may contain fillers, processing aids, cross-linking aids, cross-linking accelerators, antioxidants, cross-linking acceleration aids, cross-linking retarders, softeners, dispersing agents, colorants or the like.

The second rubber is, for example, at least one rubber selected from the group consisting of natural rubber, butadiene rubber, butyl rubber, acrylonitrile-butadiene rubber, urethan rubber, silicon rubber, fluoro rubber, isoprene rubber, chloroprene rubber, styrene-butadiene rubber, ethylene-propylene rubber, polynorbornene rubber, ethylene-propylene-diene rubber, nitrile rubber and hydrogenated nitrile rubber. Particularly at least one rubber selected from the group consisting of natural rubber, butadiene rubber, butyl rubber, acrylonitrile-butadiene rubber, urethane rubber, silicone rubber, fluoro rubber, isoprene rubber, chloroprene rubber, styrene-butadiene rubber, ethylene-propylene rubber and polynorbornene rubber is preferable, and at least one rubber selected from the group consisting of butadiene rubber, butyl rubber, acrylonitrile-butadiene rubber, isoprene rubber and ethylene-propylene-diene rubber is more preferable.

Measurement Method for Volume Resistivity of Core

The measurement for the volume resistivity of the core is the same as the above mentioned measurement method for the volume resistivity of the shell, except that the measurement location is a location corresponding to the core, and the applied voltage to measure the current value is 1V.

Configuration (2)

The number of cores included in the domain A is not limited to one. If the domain A includes a plurality of cores, then the cores preferably maintain at least a certain distance or more from each other.

Specifically, it is preferable that the domain A includes a plurality of cores, and an arithmetic average value Dm of a distance between cores is 0.20 to 2.00 μm.

The arithmetic average value Dm of the distance between cores is preferably 2.00 μm or less, is more preferably 1.00 μm or less, and is even more preferably 0.80 m or less. If the arithmetic average value Dm of the distance between cores is in this range, the impedance on the low frequency side can be more easily set to the above mentioned range. On the other hand, in terms of storing a sufficient amount of charges in the domain by clearly isolating each core by the insulating region, the arithmetic average value Dm of the distance between cores is preferably 0.20 μm or more, and is ideally 0.30 μm or more. In other words, the arithmetic average value Dm of the distance between cores may be, for example, 0.20 to 2.00 μm, 0.30 to 1.00 μm, or 0.30 to 0.80 μm. The adjustment method for the arithmetic average value Dm of the distance between cores will be described later.

<Measurement Method for Arithmetic Average Value Dm of Distance Between Cores>

The arithmetic average value Dm of the distance between cores is measured as follows. First slices are prepared using the same method as the method for measuring the volume resistivity of the matrix described above. Then the fracture surface is formed using such a method as a freeze-fracture method, a cross-polisher method, and a focused ion beam method (FIB). In terms of the smoothness of the fracture surface and the pre-treatment for observation, the FIB method is preferable. To observe the matrix-domain structure well, a pre-treatment is performed so that a clear contrast of the core and the shall can be observed. Specifically, a dyeing agent to identify the second rubber and the third rubber respectively, such as osmium tetroxide, ruthenium tetroxide, or phosphotungstic acid may be selected. In the later mentioned examples, phosphotungstic acid was used for dyeing. The types of rubber can be determined and the core and shell can be distinguished thereby since dyeing progresses more as the amount of double bonds and benzene rings of the rubber is higher.

The slice, after forming the fracture surface and performing pre-treatment, is observed by a scanning electron microscope (SEM) or a transmission electron microscope (TEM), and the presence of the matrix-domain structure is confirmed. For example, observation is performed at a 1000 times to 100000 times magnification using the SEM, so that quantization of the surface area of the domain becomes accurate.

The arithmetic average value Dm of the distance between cores is measured by quantizing the image of the fracture surface where the matrix-domain structure appears. The image of the fracture surface is obtained by observing with the SEM, and is converted into an 8-bit grayscale image using image processing software (product name: "LUZEX-AP" (made by Nireco Corp.)), whereby a 256 grayscale monochrome image is obtained. Then white and black of the image are inverted so that the core on the fracture surface becomes white, and binarization processing is performed.

Then the distance between cores in the image is calculated. The distance between cores here is the shortest distance between adjacent cores. In the case of the cylindrical electrophotographic member, where the length of the conductive layer in the longitudinal direction is L and the thickness of the conductive layer is T, cross-sections in the thickness direction of the conductive layer, as indicted in FIG. 5B, are obtained at three locations (center of the conducive layer in the longitudinal direction, and locations at L/4 from both ends of the conductive layer toward the center). For each of the obtained cross-sections, an observation region of 15 μm square is disposed at three locations (0.2 T, 0.5 T and 0.7 T) in the thickness region from the outer surface of the conductive layer toward the support member at the depth 0.1 T to 0.9 T, and the distance between each core observed in each of these nine locations is measured.

The slice is cut out in a direction which allows observing the cross-section which includes a normal line starting from the center axis of the support member, since the surface including the support member to the outer surface of the conducive layer (charge moving direction) needs to be observed.

Manufacturing Method for Electrophotographic Member

An example of the manufacturing method for the electrophotographic member will be described below. In this example, the manufacturing method for the electrophotographic member includes the following steps (i) to (iv), but the present invention is not limited thereto as long as the configuration described in the present disclosure can be implemented.

The manufacturing method for the electrophotographic member is different depending on whether the electrophotographic member is formed using two types of rubber materials or three types of rubber materials. In the case of using three types of rubber materials, for example, the following steps (i) to (iv) are performed.

Step (i): a step of preparing a rubber composition for forming the core (hereafter also called "CMB") containing an electronic conductive agent (e.g. carbon black) and the second rubber Step (ii): a step of preparing a rubber composition for forming the matrix and the shell (hereafter also called "MSC") containing the first rubber and the third rubber Step (iii): a step of kneading CMB and MSC to prepare a rubber composition for forming the conductive layer which has the matrix-domain structure of which domain has the core-shell structure Step (iv): a step of forming the layer of the rubber composition for forming the conductive layer on the support member directly or via another layer, and curing the layer of the rubber composition to form the conductive layer The conductive layer may be formed on the support member using a rubber composition for forming the conductive layer, based on a known method (e.g. extrusion molding, injection molding, compression molding). If necessary, the conductive layer may be adhered to the support member via an adhesive. The conductive layer formed on the support member may also be vulcanized if necessary, and such a surface treatment as UV treatment may be performed thereon after polishing. In the case of performing vulcanization, a vulcanizing agent may be added to the rubber composition for forming the conductive layer in Step (iv). Then the vulcanization may be performed in the above mentioned curing. The vulcanizing agent is not especially limited, and may be sulfur, for example.

The amount of the second rubber, with respect to 100 parts by mass of the first rubber, is preferably 10 to 100 parts by mass, and is more preferably 20 to 50 parts by mass.

The amount of the third rubber, with respect to 100 pars by mass of the first rubber, is preferably 10 to 100 parts by mass, and is more preferably 10 to 30 parts by mass.

To adjust the arithmetic average volume Dm of the distance between cores to the above mentioned range, it is effective to control the following (a) to (d).

(a) Difference of respective interfacial tensions a of CMB and MSC (b) Ratio (ηm/ηd) of viscosity (ηd) of CMB and viscosity (ηm) of MSC (c) Shearing speed (y) and energy amount during shearing (EDK) when CMB and MSC are kneaded in step (iii)

(d) Volume fraction of CMB with respect to MSC in step (iii)

(a) Difference of Interfacial Tensions of CMB and MSC

If two or more types of incompatible rubbers are mixed, phase separation is normally generated. This is because the interaction between the same polymers is stronger than the interaction between different polymers, and the same polymers tend to aggregate, which drops the free energy to stabilize the state.

The interface of the phase separation structure contacts with different polymers, hence free energy becomes higher than inside the structure, which is stabilized by interactions between the same molecules. As a result, interfacial tension is generated, attempting to decrease the area contacting with different polymers, so as to decrease the free energy at the interface. If this interfacial tension is small, even different polymers are directed to be mixed uniformly so as to increase entropy. The uniformly mixed state indicates dissolution, and the SP value (solubility parameter), which is the index of solubility, tends to correlate with the interfacial tension. In other words, the interfacial tension difference between CMB and MSC may correlate with the SP value difference of the rubbers contained in CMB and MSC.

It is known that in the case of mixing three or more types of incompatible rubber materials, the dispersion states will vary depending on the SP values of the rubber materials that are mixed.

In the case of forming the conductive layer which has the matrix-domain structure where the domain has the core-shell structure, it is preferable to select rubber materials so that the SP value of the rubber material forming the shell has an intermediate value between the SP values of the rubber materials forming the matrix and the core, and it is preferable that the SP value of the rubber material forming the shell is smaller than the SP value of the rubber material forming the matrix, and the SP value of the rubber material forming the shell exceeds the SP value of the rubber material forming the core. Rubbers having similar SP values have high affinity, hence if the SP value of the rubber material forming the matrix, the SP value of the rubber material forming the shell, and the SP value of the rubber material forming the core have the above mentioned relationship, the domain A can more easily have the core-shell structure.

The difference between the absolute values of the solubility parameters of each rubber material is preferably 0.4 to 5.0 $(J/cm^3)^{0.5}$, and is more preferably 0.4 to 2.2 $(J/cm^3)^{0.5}$. If in this range, a stable phase separation structure can be formed, and the domain diameter D can be decreased.

The thickness of the conductive layer is not especially limited, as long as the target functions and effects of the electrophotographic member can be obtained. The thickness of the conductive layer is preferably from 1.0 mm to 4.5 mm.

Measurement Method for SP Value

The SP value can be accurately calculated by generating a calibration curve using a material of which SP value is already known. For this SP value, a catalog value of a material manufacturer may be used. For example, the SP values of NBR and SBR are virtually determined by the content ratios of acrylonitrile and styrene, without depending on the molecular weight.

Therefore the content ratio of acrylonitrile or styrene of the rubbers constituting the matrix and the domain are analyzed using such an analysis method as pyrolysis gas-chromatography (Py-GC) or solid-state NMR. Then the SP values can be calculated using the calibration curve obtained from a material of which SP value is known.

The SP value of isoprene rubber can be determined using an isomer structure, such as 1,2-polyisoprene, 1,3-polyisoprene, 3,4-polyisoprene, cis-1,4-polyisoprene and trans-1,4-polyisoprene. Hence just like the case of SBR and NBR, the isomer content ratio is analyzed using Py-GC, solid-state NMR or the like, and the SP value can be calculated based on a material of which SP value is known.

The SP value of the material of which SP value is known has been determined by the Hansen solubility sphere method.

(b) Ratio of Viscosity of CMB and MSC

As the viscosity ratio (ηd/ηm) of CMB and MSC is closer to 1, the domain diameter can be smaller. Specifically, the viscosity ratio is preferably from 1.0 to 2.0. The viscosity ratio of CMB and MSC can be adjusted by selecting the Mooney viscosities of the material rubbers used for CMB and MSC, and the type and amount of filler that is blended.

It is also possible to add a plasticizer (e.g. paraffin oil) in an amount that does not interrupt the generation of the phase separation structure. The viscosity ratio may be adjusted by adjusting the temperature during kneading.

The viscosity of the rubber composition for forming the core and the viscosity of the rubber composition for forming the shell are obtained by measuring the Mooney viscosity $ML_{(1+4)}$ at the rubber temperature during kneading, based on JISK6300-1: 2013.

(c) Shearing Speed and Energy Amount During Shearing when MSC and CMB are Kneaded The distance between domains can be decreased as the shearing speed increases when MSC and CMB are kneaded, and as the energy amount during shearing is larger.

The shearing speed can be increased by increasing the inner diameter of the stirring members (e.g. blade and screw of the kneading machine), so as to decrease the space from the end face of the stirring member to the inner wall of the kneading machine, and to increase the rotation frequency. To increase the energy during shearing, the rotation frequency of the stirring member is increased, or the viscosities of the second rubber in CMB and the first and third rubbers in the MSC are increased.

(d) Volume Fraction of CMB with Respect to MSC in Step (iii)

The volume fraction of CMB, with respect to MSC, correlates with the collision/union probability of the rubber composition for forming the core, with the rubber composition for forming the matrix and the shell. Specifically, the collision/union probability of the rubber composition for forming the core, with the rubber composition for forming the matrix and the shell drops if the volume fraction of the rubber composition for forming the core, with respect to the rubber composition for forming the matrix and the shell, is decreased. In other words, in a range where the necessary conductivity is obtained, the distance between the cores can be decreased by decreasing the volume fraction of the core in the matrix.

The volume fraction of CMB with respect to MSC is preferably from 15 volume % to 40 volume %.

It is preferable that the conductive layer satisfies the following Configuration (3). It is preferable that the conductive layer satisfies the following Configuration (4). It is more preferable that the conductive layer satisfies the following Configuration (3) and Configuration (4).

Configuration (3) A ratio of a cross-sectional area of the electronic conductive agent contained in the core, with respect to a cross-sectional area of the core, is 20 area % or more.

Configuration (4) In a case where a circumference of the core is A and an envelope circumference of the core is B, A and B satisfy the Expression (6) below.

$$1.00 \leq A/B \leq 1.10 \tag{6}$$

Configuration (3) and Configuration (4) can be regarded as the component with respect to the shape of the core. "The shape of the core" is defined as a cross-sectional shape of the core that appears in the cross-section of the conductive layer in the thickness direction.

The shape of the core is measured as follows. In the case of a cylindrical charging member, of which length of the conductive layer in the longitudinal direction is L and the thickness of the conductive layer is T, cross-sections of the conductive layer in the thickness direction, as illustrated in FIG. 5B, are acquired at three locations, that is, the center of the conductive layer in the longitudinal direction, and at positions at L/4 from both ends of the conductive layer toward the center. For each of the acquired cross-sections, the observation regions of 15 μm square are disposed at three locations (0.2 T, 0.5 T and 0.7 T) in the thickness regions at 0.1 T to 0.9 T depth from the outer surface of the conductive layer toward the support member. The shape of the core is defined by the shape of each core observed in each of the nine observation regions.

It is preferable that the shape of the core is such that the peripheral surface thereof has no unevenness. By decreasing the unevenness, the non-uniformity of the electric fields between cores can be reduced, that is, the locations where electric field concentration is generated are decreased, and the phenomena of transporting excessive charges in the shells can be further decreased.

The present inventors obtained knowledge that an amount of the electronic conductive agent contained in one core influences the outer shape of the core. In other words, the present inventors obtained knowledge that as the amount of the filling of the electronic conductive agent in one core increases, the outer shape of the core becomes closer to a sphere. And as the number of cores close to a spherical shape increases, the concentration points of transferring electrons between cores can be decreased. According to study by the present inventors, in a cross-sectional area of one core, a core, of which ratio of the total cross-sectional area of the electronic conductive agent observed in this cross-section is 20.0 area % or more, tends to have a shape close to a sphere more easily, although the reason for this is not clear. As a result, it is preferable because it can adopt the outer shape that can significantly reduce the concentration of transferring electrons among cores. In other words, it is preferable that the ratio of the cross-section of the conductive particles contained in the core, with respect to the cross-sectional area of the core, is 20.0 area % or more. The upper limit of the ratio of the cross-sectional area of the conductive particles is not especially limited, but may be 20.0 to 30.0 area %, or 20.0 to 28.0 area %, for example.

To implement the shape of the core without unevenness on the peripheral surface, it is preferable to satisfy the following Expression (6). If there is not much unevenness, the non-uniformity of the electric field between the cores can be reduced, that is, locations where electric fields concentrate are decreased, and transporting excessive charges in the shells can be further suppressed.

$$1.00 \leq A/B \leq 1.10 \tag{6}$$

(A: circumference of core; B: envelope circumference of core)

Figure 8:
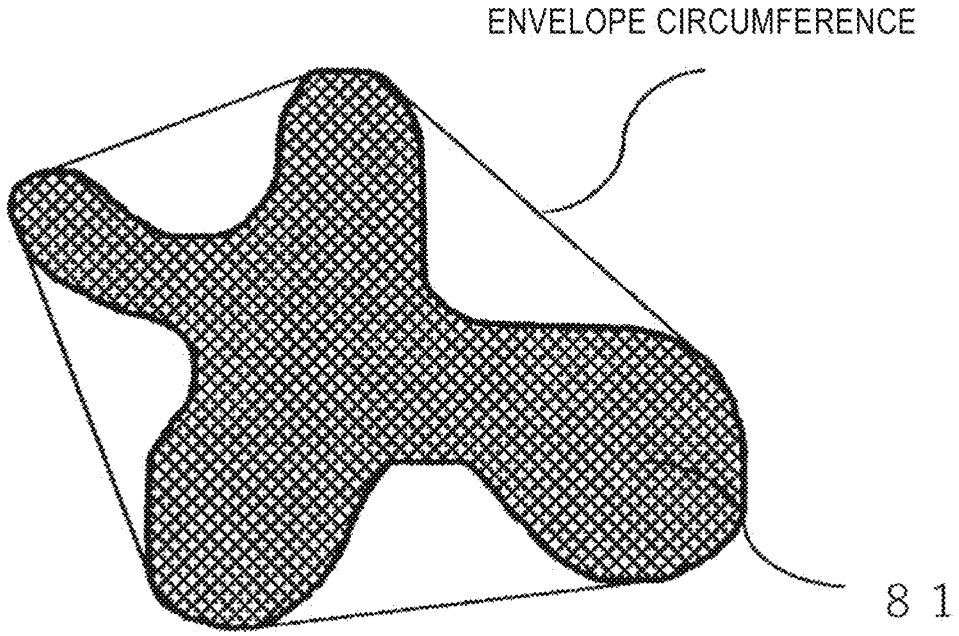
FIG. 8 is a diagram for describing an envelope circumference.

Expression (6) indicates a ratio of the circumference A of the core with respect to the envelope circumference B of the core. The envelope circumference here means the circumference when the protruding portions of the core 81, observed in the observation region, are connected, as illustrated in FIG. 8.

The ratio of the circumference of the core, with respect to the envelope circumference of the core, is 1 at the minimum, and the state of 1 indicates that the core has no unevenness in a cross-sectional shape (e.g. a perfect circle, ellipse). If this ratio exceeds 1.1, a higher unevenness exists in the core, that is, anisotropy of the electric field is generated.

Measurement Method for Each Parameter Related to Shape of Core

First the shape of the core on each cross-section is evaluated as follows, using the same method as the measurement method for volume resistivity of the outer peripheral region of the domain A described above. However as mentioned below, the slice is prepared by a cross-section that is vertical to the longitudinal direction of the electrophotographic member, and the shape of the core on the fracture surface of this slice is evaluated. The reason for this will be described below.

FIGS. 5A and 5B are diagrams depicting the shape of the electrophotographic member 51 three-dimensionally in three axes (X, Y and Z). In FIGS. 5A and 5B, the X axis indicates a direction parallel with the longitudinal direction (axial direction) of the electrophotographic member, and the Y and Z axes indicate directions vertical to the axial direction of the electrophotographic member. The Z axis is the thickness direction of the conductive layer.

FIG. 5A is a diagram indicting an image when a slice is cut out from the electrophotographic member at a cross-section 52*a* parallel with an XZ plane 52. The XZ plane 52 can be rotated 360° around the axial of the electrophotographic member. Considering that the electrophotographic member contacts with the photosensitive drum and rotates, and that electricity is discharged when passing through the gap with the photosensitive drum, the cross-section 52*a* parallel with the XZ plane 52 indicates a plane where the discharge is generated simultaneously at a certain timing. When a surface corresponding to a predetermined amount of cross-section 52*a* passes, the surface potential is generated on the photosensitive drum.

Therefore in order to evaluate the shape of the core, correlated with the electric field concentration inside the electrophotographic member, it is necessary to evaluate the cross-section parallel with the XY plane 53, which is vertical to the axial direction of the electrophotographic member, where the core shape, including the predetermined amount of cross-section 52*a*, can be evaluated. For this evaluation, when the length of the conductive layer in the longitudinal direction is L, three locations are selected, that is, the cross-section 53*b* at the center of the conductive layer in the longitudinal direction, and the two cross-sections (53*a* and 53*c*) at the positions at L/4 from both ends of the conductive layer toward the center (FIG. 5B).

To observe the cross-sections 53*a* to 53*c* when the thickness of the conductive layer is T, the observation regions of 15 μm square are disposed at three locations (0.2 T, 0.5 T and 0.7 T) in the thickness regions at a 0.1 T to 0.9 T depth from the outer surface of each slice respectively (total of nine locations), and measurement is performed at the nine locations.

The fracture surface may be formed using such a method as a freeze-fracture method, a cross-polisher method, and a focused ion beam method (FIB). In terms of the smoothness of the fracture surface and the pre-treatment for observation, the FIB method is preferable. To observe the matrix-domain structure, a pre-treatment, such as dyeing processing and deposition processing, may be performed so that a clear contrast of the conductive phase and the insulation phase can be observed.

In the slice, after forming the fracture surface and performing pre-treatment, the matrix-domain structure can be observed using a scanning electron microscope (SEM) or a transmission electron microscope (TEM). Particularly, in terms of accuracy of quantization of the area of the domain, observation at a 1000 times to 100000 times magnification using the SEM is preferable.

The circumference and the envelope circumference of the core can be measured by quantizing the captured image, as mentioned above. For the fracture surface images obtained by the SEM, the analysis regions of 15 μm square are extracted from the nine images obtained at each observation position respectively, using image processing software, such as Image Pro Plus (made by Media Cybernetics Co.), and 8-bit grayscale processing is performed, whereby 256 gradation monochrome images are obtained. Then the white and black of an image are inverted so that the domains on the fracture surface become white, then the image is binarized so as to obtain a binary image for analysis.

Measuring Method for Cross-Sectional Area Ratio of the Electronic Conductive Agent in Core The cross-sectional area ratio of the electronic conductive agent in the core can be measured by quantizing the above mentioned binary image. For the binary image, the cross-sectional area S of the domain and the total Sc of the cross-sectional areas of the portion constituted of the conductive agent in each core are calculated using the count function included in image processing software Image Pro Plus (made by Media Cybernetics Co.). Then the arithmetic average value (%) of (Sc/S)×100 is calculated.

In the case of a cylindrical charging member, of which length of the conductive layer in the longitudinal direction is L and the thickness of the conductive layer is T, cross-sections of the conductive layer in the thickness direction, as illustrated in FIG. 5B, are acquired at three locations, that is, at the center of the conductive layer in the longitudinal direction, and at the positions at L/4 from both ends of the conductive layer toward the center. For each of the acquired cross-sections, the above mentioned measurement is performed at the regions of 15 μm square at three locations (0.2 T, 0.5 T and 0.7 T) in the thickness regions at a 0.1 T to 0.9 T depth from the outer surface of the conductive layer toward the support member, and the arithmetic average of the measurement values determined at a total of nine locations is calculated.

Measurement Method for Circumference a and Envelope Circumference B of Core

The circumference and the envelope circumference of the core can be measured by quantizing the above mentioned binary image. The circumference A and the envelope circumference B of each core in a domain group in the image are calculated using the count function of the image processing software Image Pro Plus (made by Media Cybernetics Co.) for the binary image, and thereby the arithmetic average value of the circumference ratio A/B of the core can be calculated.

In the case of cylindrical charging member, of which length of the conductive layer in the longitudinal direction is L and the thickness of the conductive layer is T, cross-sections of the conductive layer in the thickness direction, as illustrated in FIG. 5B, are acquired at three locations, that is, at the center of the conductive layer in the longitudinal direction, and at the positions at L/4 from both ends of the conductive layer toward the center. For each of the acquired cross-sections, the above mentioned measurement is performed in the regions of 15 μm square at three locations (0.2 T, 0.5 T and 0.7 T) in the thickness regions at a 0.1 T to 0.9 T depth from the outer surface of the conductive layer toward the support member, and the arithmetic average of the measured values determined at a total of nine locations is calculated.

As specified in Configuration (3), by filling the conductive particles in the core at high density, the outer shape of the core can be close to a sphere, and unevenness of the surface can be decreased, as specified in Configuration (4).

To obtain a domain in which the electronic conductive agent is filled at high density, carbon black, of which DBP oil absorption amount is 40 to 80 $cm^3$/100 g, is particularly preferable as the electronic conductive agent. The DBP oil absorption amount ($cm^3$/100 g) is a volume of dibutyl phthalate (DBP) which 100 g of carbon black can adsorb, and is measured according to Japan Industrial Standard (JIS) K6217-4: 2017 ((Carbon black for rubbers—basic characteristics—Part 4: How to determine oil absorption amount (including compressed sample)).

Carbon black normally has a clustered higher order structure, where primary particles (average particle diameter: 10 nm to 50 nm) are aggregated. This clustered higher order structure is simply called "structure", and the level of the structure is quantized using the DBP oil absorption amount ($cm^3$/100 g).

If the DBP oil absorption amount of the conductive carbon black is within the above range, the structure is underdeveloped, and the aggregation of the carbon black is less, that is, the carbon black is dispersed well in the rubber. Therefore the filling amount of the carbon black in the core can be increased, and as a result, the outer shape of the core can be closer to a sphere. Further, the conductive carbon black, in which the DBP oil absorption amount is within the range described above, is effective to generate a domain that satisfies the Requirement (4) because it is difficult to form aggregates.

The charge attenuation rate of the electrophotographic member is not especially limited, but is preferably 50 to 95%, and is more preferably 65 to 95%. In this range, the charges, which are charged up due to adhering contaminating substances, can be moved toward the support member side more easily. The charge attenuation rate can be decreased by increasing the volume resistivity of the matrix, and can be increased by decreasing the volume resistivity of the matrix, for example.

Calculation Method for Charge Attenuation Rate

The charge attenuation rate can be calculated by measuring the surface potential of the charged surface of the electrophotographic member. For example, voltage is applied to a corona discharger to discharge electricity, and the surface of the electrophotographic member is charged thereby. Then the surface potential of the charging roller immediately after charging ended and the surface potential of the charged roller 10 seconds later are measured. Based on the change between the surface potential immediately after the discharge and the surface potential 10 seconds later, the charge attenuation rate can be calculated. A specific method thereof will be described later.

Process Cartridge

The present disclosure provides a process cartridge detachably attached to a main body of an electrophotographic image forming apparatus, wherein the process cartridge comprises:

an electrophotographic photosensitive member, and a charging member arranged so as to be capable of charging the electrophotographic photosensitive member, and the charging member is the electrophotographic member of the present disclosure.

Figure 9:
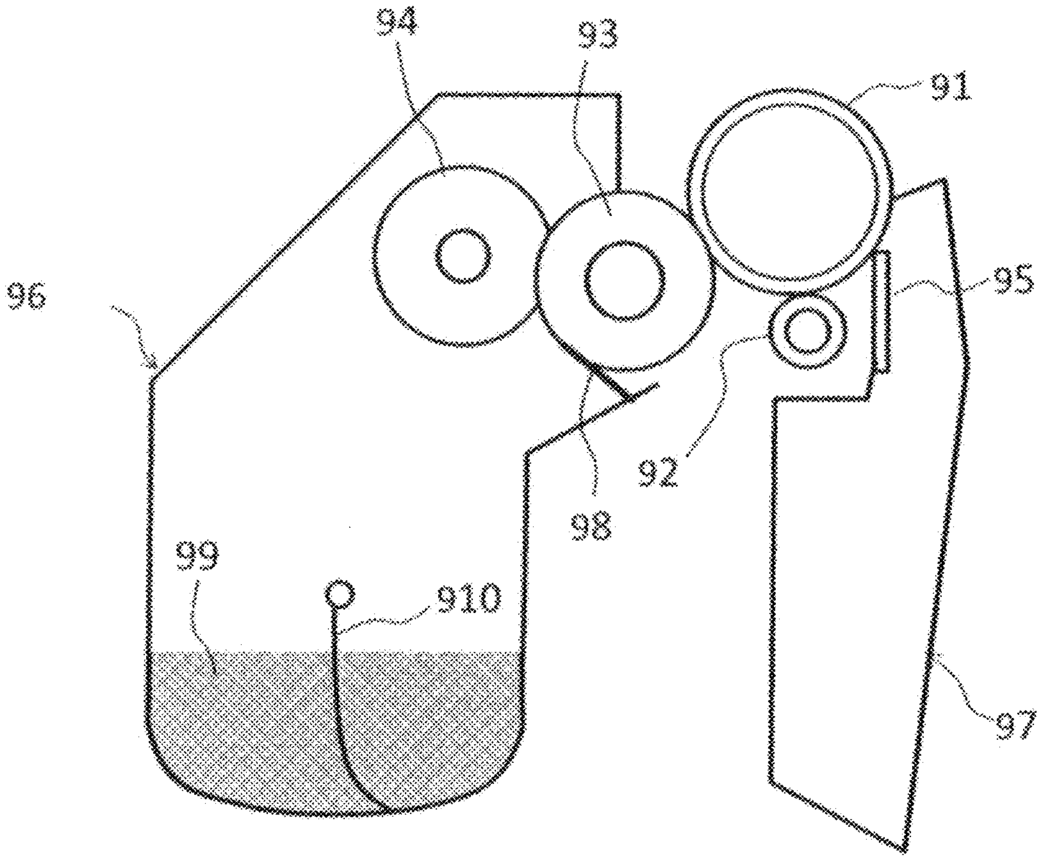
FIG. 9 is a schematic diagram depicting a process cartridge.

FIG. 9 is a schematic cross-sectional view of the process cartridge for electro photographs, which includes the electrophotographic member according to the present invention as the charging roller. This process cartridge is an integration of a developing apparatus and a charging apparatus, and is detachably attached to the main body of the electrophotographic apparatus.

The developing apparatus is an integration of at least a developing roller 93 and a toner container 96, and may also include a toner supply roller 94, toner 99, a developing blade 98 and a stirring blade 910 if necessary.

The charging apparatus is an integration of at least a photosensitive drum 91, a cleaning blade 95 and a charging roller 92, and may also include a waste toner container 97. Voltage is applied to the charging roller 92, the developing roller 93, the toner supply roller 94 and the developing blade 98 respectively.

The electrophotographic member according to the present disclosure may be used as the charging roller, the developing roller, the developing blade and the toner supply roller. The electrophotographic member is preferably a charging member, and is more preferably a charging roller.

Electrophotographic Image Forming Apparatus

The present disclosure provides an electrophotographic image forming apparatus, comprising: an electrophotographic photosensitive member; and a charging roller arranged so as to be capable of charging the electrophotographic photosensitive member, wherein the charging roller is the electrophotographic member of the present disclosure.

Figure 10:
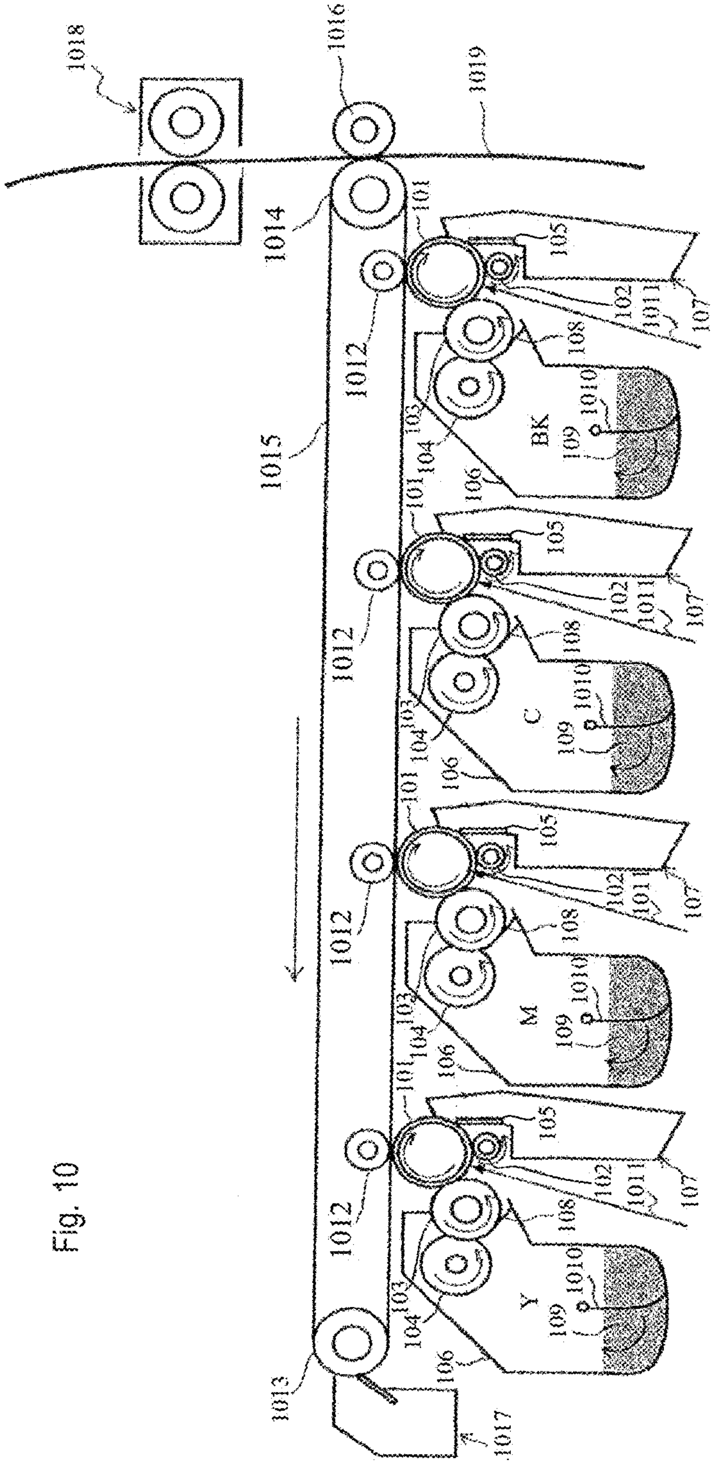
FIG. 10 is a schematic diagram depicting an electrophotographic apparatus.

FIG. 10 is a schematic cross-sectional view of the electrophotographic image forming apparatus which uses the electrophotographic member according to the present invention as the charging roller. This electrophotographic image forming apparatus is a color electrophotographic apparatus to which the process cartridge is detachably attached. For each process cartridge, toner of each color (black BK, magenta M, yellow Y and cyan C) is used.

A photosensitive drum 101 rotates in the arrow direction, and is uniformly charged by a charging roller 102 to which voltage is applied from a charging bias power supply, and an electrostatic latent image is formed on the surface of the photosensitive drum 101 by an exposure light 1011. Toner 109, stored in a toner container 106, is supplied to a toner supply roller 104 by a stirring blade 1010, and is conveyed onto a developing roller 103. Then by a developing blade 108, which is disposed contacting the developing roller 103, the toner 109 is uniformly coated on the surface of the developing roller 103, and charges are provided to the toner 109 by triboelectric charging. The above mentioned electrostatic latent image is developed by the toner 109, which is conveyed by the developing roller 103 disposed contacting the photosensitive drum 101, and is visualized as a toner image thereby.

The visualized toner image on the photosensitive drum is transferred to an intermediate transfer belt 1015, which is supported and driven by a tension roller 1013 and an intermediate transfer belt driving roller 1014, by a primary transfer roller 1012 to which voltage is applied by a primary transfer bias power supply. A toner image of each color is sequentially superimposed and a color image is formed on the intermediate transfer belt.

A transfer material 1019 is fed into the apparatus by a paper feeding roller, and is conveyed between the intermediate transfer belt 1015 and a secondary transfer roller 1016. The secondary transfer roller 1016, to which voltage is applied from a secondary transfer bias power supply, transfers the color image on the intermediate transfer belt 1015 to the transfer material 1019. The color image transferred onto the transfer material 1019 is fixed by a fixing unit 1018, and then the transfer material 1019 is discharged out of the apparatus, and print operation ends.

The untransferred toner remaining on the photosensitive drum is scraped off by a cleaning blade 105, is stored in a waste toner container 107, and the cleaned photosensitive drum 101 is subject to a repeat of the above steps. The untransferred toner remaining on the primary transfer belt is scraped off by a cleaning apparatus 1017.

The above is an example of a color electrophotographic apparatus, but in the case of a monochrome electrophotographic apparatus (not illustrated), only a process cartridge containing black toner is used. The monochrome image is directly formed on the transfer member by the process cartridge and the primary transfer roller (there is no secondary transfer roller) without using the intermediate transfer belt. Then the monochrome image is fixed by the fixing unit, and the transfer material is discharged out of the apparatus, whereby print operation ends.

EXAMPLES

Examples of the present disclosure will now be described, but the technical scope of the present disclosure is not limited thereto.

Examples and comparative examples will be described below. The electrophotographic members described in examples and comparative examples were prepared using the materials indicated in Table 1.

TABLE 1

| Material type | Material abbreviation | Material name | Product name | Manufacturer name |
|---|---|---|---|---|
| Rubber material | N230SV | Acrylonitrile-butadiene rubber (NBR) | NBR NZ30SV | JSR Corp. |
| | N202S | Acrylonitrile-butadiene rubber (NBR) | NBR N202S | JSR Corp. |
| | A303 | Styrene-butadiene rubber (SBR) | Asaprene 303 | Asahi Kasei Corp. |
| | T2003 | Styrene-butadiene rubber (SBR) | Tufdene 2003 | Asahi Kasei Corp. |
| | Esplene505A | Ethylene-propylene-diene rubber (EPDM) | Esplene505A | Sumitomo Chemical Co., Ltd. |
| | Esplene301A | Ethylene-propylene-diene rubber (EPDM) | Esplene301A | Sumitomo Chemical Co., Ltd. |
| | BR150B | Polybutadiene rubber (BR) | UBEPOL BR150B | Ube Corp. |
| | IR2200L | Isoprene rubber (IR) | Nipol IR2200L | Zeon Corp. |
| | B31 | Chloroprene rubber (CR) | SKYPRENE B31 | Tosoh Corp. |
| | Butyl 065 | Butyl rubber (Butyl) | Butyl 065 | JSR Corp. |
| | CG102 | Epichlorohydrin rubber | Epichlomer CG 102 | Osaka Soda Co., Ltd. |
| Conductive agent | #7360SB | Conductive carbon black DBP adsorption: 87 cm3/100 g | TOKABLACK#7360SB | Tokai Carbon Co., Ltd. |
| | Tin oxide | Tin type oxide DBP adsorption: 80 cm3/100 g | S-2000 | Mitsubishi Materials Electronic Chemicals Co., Ltd. |
| | EC100J | Conductive carbon black DBP adsorption: 350 cm3/100 g | EC100J | Lion Specialty Chemicals Co., Ltd. |
| Vulcanization agent | PMC | Sulfur | SULFAX PMC | Tsurumi Chemical Industry Co., Ltd. |
| Vulcanization accelerator | TBzTD | Tetrabenzylthiuram disulfide | Sanceler TBzTD | Sanshin Chemical Industry Co., Ltd. |
| Filler | #30 | Calcium carbonate | Nanox #30 | Maruo Calcium Co., Ltd. |

Example 1

1. Preparing Unvulcanized Rubber Composition Used for Forming Conductive Layer

1-1. Preparing Carbon Masterbatch (CMB) for Forming Core

Each material indicated by type and blending amount in Table 2 was mixed using a 6 liter pressurized kneader (product name: TD6-15MIDX, made by Toshin Co., Ltd.) to obtain the CMB for forming a core. The mixing conditions were: a filling ratio of 70 vol. %, a blade rotation frequency of 30 rpm, and a kneader temperature of 130° C., for 16 minutes.

TABLE 2

| | Material name | Blending amount (parts by mass) |
|---|---|---|
| Second rubber | EPDM (product name: Esplene 505A, made by Sumitomo Chemical Co., Ltd.) | 100 |
| Electronic conductive agent | Carbon black (Product name: Toka black #7360SB, made by Tokai Carbon Co., Ltd.) | 60 |
| Vulcanization acceleration aid | Zinc oxide (Product name: Zinc oxide grade 2, made by Sakai Chemical Industry Co. Ltd.) | 5 |
| Processing aid | Zinc stearate (Product name: SZ-2000. made by Sakai Chemical Industry Co. Ltd.) | 2 |

1-2. Preparing Rubber Composition (MSC) for Forming Matrix and Shell

Each material indicated by type and blending amount in Table 3 was mixed using a 6 liter pressurized kneader (product name: TD6-15MDX, made by Toshin Co., Ltd.) to obtain the rubber composition for forming a matrix and a shell. The mixing conditions were: a filling ratio of 70 vol. %, a blade rotation frequency of 30 rpm, and a kneader temperature of 100° C., for 16 minutes.

TABLE 3

| | Material name | Blending amount (parts by mass) |
|---|---|---|
| First rubber | NBR (Product name: JSR NBR N230SV, made by JSR Co., Ltd.) | 80 |
| Third rubber | EPDM (Product name: Esplene 505A, made by Sumitomo Chemical Co., Ltd.) | 20 |
| Filler | Calcium carbonate (Product name: Nanox #30, made by Maruo Calcium Co., Ltd.) | 40 |
| Vulcanization acceleration aid | Zinc oxide(Product name: Zinc Oxide Two types, made by Sakai Chemical Industry Co., Ltd.) | 5 |
| Processing aid | Zino stearate (Product name: SZ2000, made by Sakal Chemical Industry Co., Ltd.) | 2 |

1-3. Preparing Unvulcanized Rubber Composition for Forming Conductive Layer

Each material indicated by type and blending amount in Table 4 was mixed using a 6 liter pressurized kneader (product name: TD6-15MDX, made by Toshin Co., Ltd.) to obtain the unvulcanized rubber composition. The mixing conditions were: a filling ratio of 70 vol. %, a blade rotation frequency of 30 rpm, and a kneader temperature of 100° C., for 16 minutes.

TABLE 4

| | Material name | Blending amount (parts by mass) |
|---|---|---|
| Material rubber | Rubber composition for forming core (CMB) | 26 |
| Material rubber | Rubber composition for forming matrix and shell (MSC) | 74 |

Each material indicated by type and blending amount in Table 5 was mixed using an open roll to obtain an unvulcanized rubber composition for forming a conductive layer. The mixing machine used here was an open roll of which roll diameter was 12 inches. The mixing conditions were: a front roll rotation frequency of 10 rpm and a rear roll rotation frequency of 8 rpm. After switching the roll at the left and right a total of 20 times with a roll gap of 2 mm, tight milling was performed 10 times with a roll gap of 1.0 mm.

TABLE 5

| | Material name | Blending amount (parts by mass) |
|---|---|---|
| Material rubber | Unvulcanized rubber composition | 100 |
| Vulcanizing agent | Sulfur (Product name: Sulflax PMC, sulfur component of 97.5%, made by Tsurumi Chemical Industry Co., Ltd.) | 3 |
| Vulcanization accelerator 1 | Tetrabenzylthiuram disulfide (Product name: Sanceler TBzTD, made by Sanshin Chemical Industry Co., Ltd.) | 1 |
| Vulcanization accelerator 2 | N-t-butyl-2-Benzothiazole sulfenimide (Product name: SANTOCRE-TBSI, made by FLEXSYS Corp.) | 0.5 |

2. Preparing Electrophotographic Member (Conductive Member)

2-1. Forming Conductive Layer

For the support member, a core metal (252 mm long, 6 mm outer diameter), generated by performing electroless nickel plating on the surface of free cutting steel, was prepared. This core metal was used as a conductive shaft core (support member). Then using a roll coater, an adhesive (product name: Metaloc U-20, made by Toyokagaku Kenkyusho, Co. Ltd.) was coated on the entire surface of the core metal in a 230 mm range, excluding each end 11 mm thereof. In this example, the core metal coated with adhesive was used as the conductive support member.

Then a die (inner diameter: 10.0 mm) was attached to a tip of the cross-head extruder which included a supply mechanism of the conductive support member and a discharge mechanism of the unvulcanized rubber roller. The temperature of the extender and the cross-head was adjusted to 100° C., and the conveying speed of the conductive support member was adjusted to 60 mm/sec. Under these conditions, the unvulcanized rubber composition for forming a conductive layer was supplied using the extruder, and the outer peripheral portion of the conductive support member was coated with the unvulcanized rubber composition for forming a conductive layer inside the cross-head, whereby an unvulcanized rubber roller was obtained.

Then the unvulcanized rubber roller was placed in a hot air vulcanizing furnace (170° C.) and was heated for 60 minutes, whereby the unvulcanized rubber composition was vulcanized, and the conductive layer where a conductive layer was formed on the outer peripheral portion of the conductive support member was obtained. Then 10 mm of each end of the conductive layer was cut off, so that the length of the conductive layer in the longitudinal direction becomes 232 mm.

2-2. Polishing Conductive Layer

Then by polishing the surface of the conductive layer according to the polishing conditions stated in the following Polishing Conditions 1, a crown-shaped charging roller 1 (diameter of center portion is 8.5 mm, and each diameter at 90 mm positions from the center to both ends is 8.44 mm) was obtained.

Polishing Conditions 1

A cylindrical-shaped grinding stone (made by Teiken Corp.), of which diameter is 305 mm and length is 235 mm, was provided. The type of grain, grain size, bonding degree, bonding agent and structure (grain percentage) are as follows.

Grain material: GC (green silicon carbide), (JISR6111-2002)

Grain size: #80 (average grain diameter: 177 m, JISB4130)

Bonding degree of grain: HH (JISR6210)

Bonding agent: V4PO (Vitrified)

Structure of grain (grain percentage): 23 (content percentage of grain: 16% JISR 6242)

The polishing conditions follow. The rotation speed of grinding stone was 2100 rpm and the rotation speed of the conductive member was 250 rpm. In the rough polishing step, the entering speed of the grinding stone to the conductive member was 20 mm/sec, and the grinding stone was allowed to enter 0.24 mm after contacting the outer peripheral surface of the conductive member. In the fine polishing step, the entry speed changed to 0.5 mm/sec. and the grinding stone was allowed to enter 0.01 mm. Then the grinding stone was separated from the conductive member and polishing was completed. For the polishing method, an upper cut method, in which the rotating directions of the grinding stone and the conductive member were the same, was used.

3. Characteristic Evaluation 3-1. Measuring Volume Resistivity of Matrix

The volume resistivity of the matrix was measured in the contact mode as follows, using the scanning probe microscope (SPM) (product name: Q-Scope 250, made by Quesant Instrument Corp.). The measurement environment was a temperature of 23° C. and relative humidity is 50%.

First about 2 μm thick slice was cut out from the conductive layer of the charging roller 1 at a cutting temperature of −100° C., using a microtome (product name: Leica EMFCS, made by Leica Microsystems). For the cut out, cross-sections of the conductive layer in the thickness direction of the conductive layer, as indicated in FIG. 5B, were obtained as mentioned above. For each of the obtained cross-sections, an observation region of 15 μm square was disposed at three locations (0.2 T, 0.5 T and 0.7 T) in the thickness region from the outer surface of the conductive layer toward the support member at the depth 0.1 T and 0.9 T, measurement was performed, and the arithmetic average of the measured values at a total of nine locations was calculated.

Then this slice was placed on a metal plate such that one surface of the slice, corresponding to the cross-section of the conductive layer, contacts with the surface of the metal plate. Then a cantilever of the SPM was contacted to a location corresponding to the matrix on the surface of the slice, opposite the surface contacting with the meal plate. Then a 50V voltage was applied to the cantilever and the current value was measured. Further, the surface profile of this slice was observed using the SPM, and the thickness of the measurement location was calculated based on the obtained height profile. Also based on the observation result of the surface profile, the surface area of the recessed portions of the portion contacting the cantilever was calculated. Then the volume resistivity was calculated from this thickness and the surface area of the recessed portions, and the result was regarded as the volume resistivity of the matrix.

3-2. Measuring Volume Resistivity of Shell

A slice was cut out using the same method as the method for measuring the volume resistivity of the matrix. Then the slice was section at 60 nm intervals using FIB-SEM, and a centroid was calculated for the acquired cross-sections using an image analyzing apparatus (product name: LUZEX-AP, made by Nireco Corp.), and the shell of the cross-section at the position with which the cantilever was contacted was measured using the same method described for measuring the volume resistivity of the matrix. Then the arithmetic average value of the values measured at the measurement positions was calculated.

The same step was repeated until the sectioning of the entire domain ends. For the three-dimensional image obtained by FIB-SEM, the centroid of volume was calculated using the image analyzing apparatus (product name: LUZEX-AP, made by Nireco Corp.), and was analyzed if the centroid of volume exists inside the domain. If the domain was domain A, the volume resistivity of the outer peripheral region of the domain on the cross-section closest to the centroid of volume of the domain was regarded as the volume resistivity of the shell.

3-3. Measuring Thickness of Shell

The following measurement was performed to evaluate the thickness of the shell.

The slice was cut out in the same way as the measurement for the volume resistivity of the shell described above. Then this slice was dyed using phosphotungstic acid. Then the slice was sectioned at 60 nm intervals using FIB-SEM, and a centroid was calculated for the obtained cross-sections using an image analyzing apparatus (product name: LUZEX-AP, made by Nireco Corp.). Then platinum was deposited on the obtained cross-section, and an image of the platinum-deposited surface was captured using SEM (product name: S-4800, made by Hitachi High Tech Corp.), at 10,000 times magnification, so as to obtain an SEM image.

Then 8-bit grayscale processing was performed on this SEM image using the image analyzing apparatus (product name: LUZEX-AP, made by Nireco Corp.), whereby a 256 gradation monochrome image was obtained. Then the black and white of the binary image was inverted so that the dyed shell in the monochrome image becomes white, then the image was binarized by setting a binarization threshold for the brightness distribution of the image, based on the algorithm of Otsu's discriminant analysis method. From the obtained binary image, the thickness of the shell was calculated. This step was repeated until the sectioning of the entire domain ends. For the three-dimensional image obtained by FIB-SEM, the centroid of volume was calculated using the image analyzing apparatus (product name: LUZEX-AP, made by Nireco Corp.), and was analyzed if the centroid of volume exists inside the domain. If the domain was the domain A, the thickness of the shell on the cross-section closest to the centroid of volume of the domain was regarded as the thickness of the shell of the domain A.

When the thickness of the conductive layer was T, an observation region of 15 μm square was disposed at three locations (0.2 T, 0.5 T and 0.7 T) in the thickness region from the outer surface of each of the three slices at the depth 0.1 T to 0.9 T (total of nine locations). In each observation region, the thickness of the shell was calculated, and the arithmetic average value of the measurement values of the thickness of each shell at nine locations was calculated.

3-4. Measuring Volume Resistivity of Core

The volume resistivity of the core was measured in a same manner as the above mentioned measurement method for the volume resistivity of the shell, except that the contact position of the cantilever was a location corresponding to the core, and the voltage applied to the cantilever was 1V. Then the average value of the values measured at the measurement positions was calculated.

3-5. Measuring Distance Between Cores

For the slice prepared for measuring the volume resistivity of the matrix, only the second rubber contained in the core was dyed using phosphotungstic acid. Then platinum was deposited on the surface corresponding to the cross-section of the conductive layer. Then an image of the platinum-deposited surface was captured using SEM (product name: S-4800, made by Hitachi High Tech Corp.) at 10,000 times magnification, so as to obtain an SEM image.

Then 8-bit grayscale processing was performed on this SEM image using the image analyzing apparatus (product name: LUZEX-AP, made by Nireco Corp.), whereby a 256 gradation monochrome image was obtained. Then the black and white of the binary image was inverted so that the dyed core in the monochrome image becomes white, then the image was binarized by setting a binarization threshold for the brightness distribution of the image, based on the algorithm of Otsu's discriminant analysis method.

For the obtained binary image, when the thickness of the conductive layer was T, an observation region of 15 μm square was disposed at three locations (0.2 T, 0.5 T and 0.7 T) in the region corresponding to the thickness region from the outer surface of each of the three slices, at the depth 0.1 T to 0.9 T (total of nine locations). In each observation region, the distance between cores was calculated, and the arithmetic average value of the measured values of each distance between cores at a total of nine locations was calculated.

3-6. Evaluating Shape of Core

The shape of a core included in the conductive layer was evaluated using the following method of quantizing the observation image obtained by the scanning electron microscope (SEM) by image processing.

A thin slice (1 mm thickness) was cut out in the same way as the measurement for the volume resistivity of the shell described above. For the thin slice, a surface vertical to the axial of the conductive support member and a fracture surface of a cross-section that was parallel with this surface were acquired. When the length of the conducive layer in the longitudinal direction was L, the cut out positions from the conductive layer were obtained at three locations, that is, the center in the longitudinal direction, and the positions at L/4 from both ends of the conductive layer toward the center. Then the cut out slice was sectioned at 60 nm intervals using FIB-SEM, and platinum was deposited on the obtained cross-section. Then an image of the platinum-deposited surface was captured using the scanning electron microscope (SEM) (product name: S-4800, made by Hitachi High Tech Corp.), at 1,000 times magnification, so as to obtain an observation image.

This step was repeated until the sectioning of the entire domain ends. For the obtained three-dimensional image, the centroid of volume was calculated using the image analyzing apparatus (product name: LUZEX-AP, made by Nireco Corp.), and was analyzed whether the centroid of volume existed inside the domain, so as to determine whether this domain was the domain A. For the core of the domain A, the shape was evaluated by the following method.

Then when the thickness of the conductive layer was T, the regions of 15 μm square deposited at three locations (0.2 T, 0.5 T and 0.7 T) in the thickness region from the outer surface of the conductive layers at the depth 0.1 T to 0.9 T (total of nine locations) of each of the three slices obtained from the three measurement positions mentioned above, were extracted as analysis images.

Then to quantize the shape of the domain in this analysis image, 8-bit grayscale processing was performed using the image processing software Image Pro Plus (made by Media Cybernetics Corp.), whereby a 256 gradation monochrome image was obtained. Then the black and white of the image were inverted so that the cores on the fracture surface became white, whereby a binary image was obtained. Then using the count function, the following items were calculated for the core group existing in this binary image.

Circumference A (μm)

Envelope circumference B (μm)

These values were substituted in Expression (6), and the ratio of the number of cores that satisfied the condition of Expression (6) was calculated as the quantity % with respect to the total number of core groups in each evaluation image, and an index of the shape of the core was determined by calculating an arithmetic average value of the evaluation images at the nine locations.

$$1.00 \leq A/B \leq 1.10 \tag{6}$$

(A: circumference of core; B: envelope circumference of core)

3-7. Measuring Charge Attenuation Rate on Charging Roller Surface

A surface potential of the charging roller, after corona discharge, was measured using a charge amount measuring apparatus (product name: DRA-2000L, made by QEA Inc.). Specifically, a corona discharger of the charge amount measuring apparatus was disposed such that a gap between a grid portion and the charging roller surface became 1 mm. Then a discharge was generated by applying an 8 kV voltage to the corona discharger, so as to charge the charging roller surface, and the surface potential immediately after this charging (immediately after the end of discharge) and the surface potential of the charging roller 10 seconds later were measured.

The charge attenuation rate Q (%) was then calculated using the following Expression (7), where E0 was the surface potential immediately after charging, and E10 was the surface potential 10 seconds later after the end of discharge (or after charging).

$$Q = \{(E0 - E10)/E0\} \times 100 \tag{7}$$

3-8. Measuring Impedance

As pre-treatment, platinum was deposited on the outer surface of the charging roller (electrophotographic member) while rotating the charging roller, whereby a measurement electrode (platinum electrode) was created. Here using masking tape, an electrode, having a 1.5 cm width and that was uniform in the circumferential direction, was created. By creating this electrode, the negative influence of surface roughness of the electrophotographic member, on the contact area of the measurement electrode and the electrophotographic member, can be minimized.

Then an aluminum sheet was wound around this electrode with no gap, whereby the measurement sample was created. Then an impedance measuring apparatus (product name: Solartron 1260 and Solartron 1296, made by Solartron Co.) was connected to the measurement electrode via the aluminum sheet, and to the outer surface of the support member.

Figure 12:
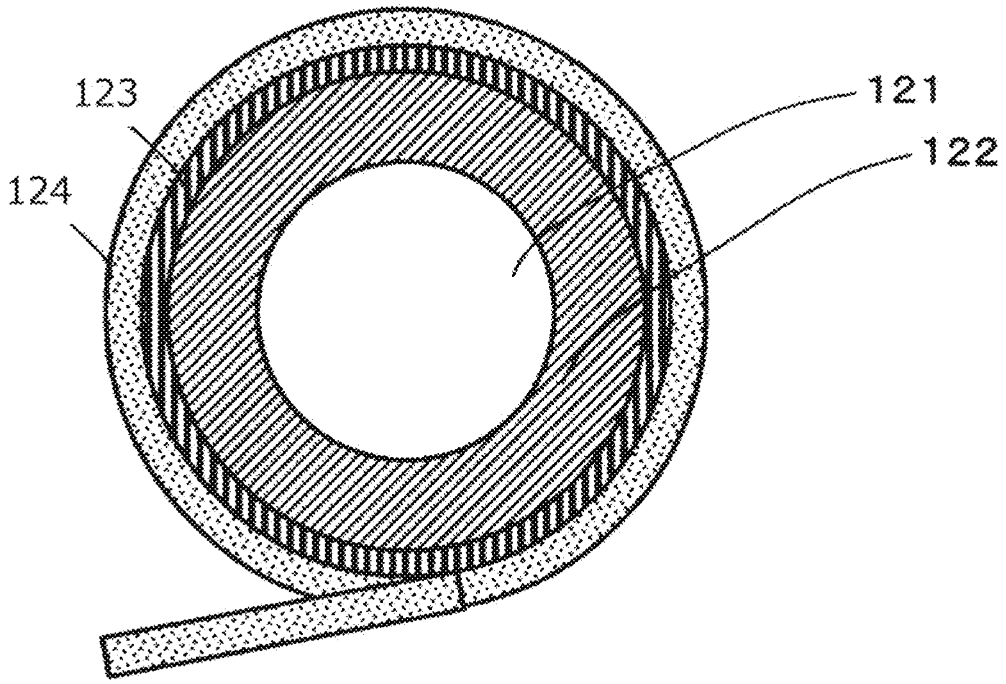
FIG. 12 is a cross-sectional view depicting a measurement electrode.

FIGS. 11 and 12 are schematic diagrams depicting a state where the measurement electrode was formed on the charging roller. In FIG. 11, 111 is the conductive support member, 112 is the conductive layer, 113 is the platinum-deposited layer, and 114 is the aluminum sheet. In FIG. 12, 121 is the conductive support member, 122 is the conductive layer having a matrix-domain structure, 123 is the aluminum-deposited layer, and 124 is the aluminum sheet.

Figure 13:
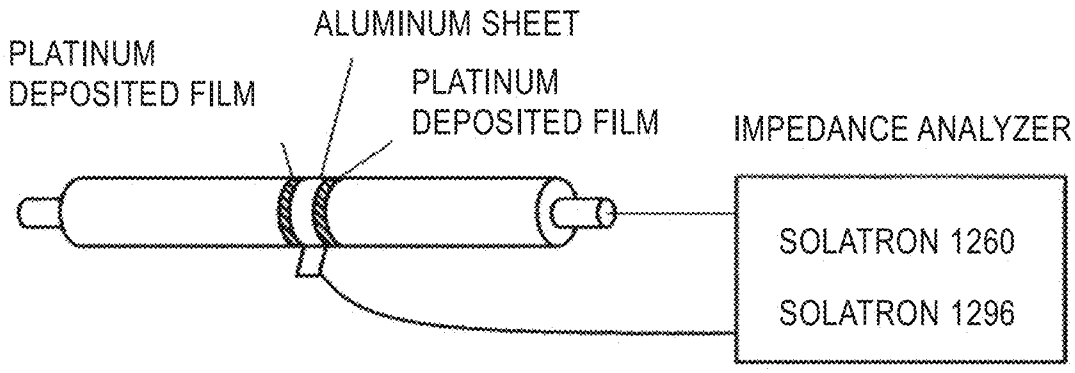
FIG. 13 is a schematic diagram depicting an impedance measurement system.

FIG. 12 is a cross-sectional view depicting a state where the measurement electrode is formed on the charging roller. As illustrated in FIG. 12, it is important to dispose the conductive layer having the matrix-domain structure between the conductive support member and the measurement electrode. Then as illustrated in FIG. 13, the aluminum sheet and the outer surface of the support member were connected to the measurement electrodes on the side of the impedance measuring apparatus (product name: Solartron 1260 and Solartron 1296, made by Solartron Co.). Impedance was measured by using the conductive support member and the aluminum sheet as two electrodes for measurement.

Impedance was measured in the environment of a temperature of 23° C. and a relative humidity of 50%, at amplitude 1V and frequency $1.0\times10^{-2}$ to $1.0\times10^{7}$ Hz. Here the measurement locations were changed every time the frequency changes 1 digit, and measurement was performed for five locations each time. The measurement locations were the center portion of each region determined by equally dividing the longitudinal direction (axial direction) of the electrophotographic member into five. The absolute value of the impedance was obtained by determining the arithmetic average value of these measured values.

Then using the measurement result, the absolute value of the impedance was plotted on the ordinate and the frequency was plotted on the abscissa in the log-log graph. Here the slope of the impedance in the frequency $1.0\times10^{-2}$ to $1.0\times10^{1}$ Hz (low frequency impedance) and the slope of the impedance in the frequency $1.0\times10^{5}$ to $1.0\times10^{6}$ Hz (high frequency impedance) were calculated.

4. Image Evaluation 4-1. Evaluating Charging Capability

The following evaluation was performed to confirm the function to suppress leaking of discharge of the charging roller 1.

First an electrophotographic type laser printer (product name: Laserjet M608dn, made by HP Co.) was prepared as an electrophotographic apparatus. Then the charging roller 1, the electrophotographic apparatus and the process cartridge were left for 48 hours in a 23° C./50% RH environment, so as to adjust to the measurement environment.

To perform the evaluation in a high-speed process, this laser printer was modified such that the number of sheets to be outputted per unit minute becomes 75 sheets/minute (A4 sized paper), which was more than the original output the number of sheets. Here the output speed of the recording media was set to 370 mm/sec., and the image resolution was set to 1200 dpi. The pre-exposing apparatus in the laser print was removed. Further, the process cartridge was modified such that the drum surface potential, after the charging process, could be measured using a surface potential probe (main body: Model 347, probe: Model 3800S-2, made by Trek Co. Ltd.).

The charging roller 1, which was left in the above mentioned environment, was set as the charging roller of the process cartridge, and was attached to the laser printer.

In the same environment as above, a −1000V voltage was applied to the charging roller 1 using an external power supply (Trek 615, made by Trek Japan Co.), and a solid white image and a solid black image were outputted thereby, then the surface potential of the photosensitive drum at this time was measured. Then the difference (black and white potential difference) between the surface potential of the photosensitive drum after the charging process when the solid black image was outputted and the surface potential of the photosensitive drum after the charging process when the solid white image was outputted was calculated. Table 8 and Table 11 are the results thereof. Low black and white potential difference means that the charging capability of the charging roller is high.

4-2. Evaluating Ghost Image

The effect of generating uniform discharge in the high-speed process of the charging roller 1, even if the surface potential of the photosensitive drum before charging is uneven, was confirmed using the following method.

To form an evaluation image, the laser printer, used for "evaluating the charging capability" mentioned above, was used. Just like the case of "evaluating the charging capability", the charging roller 1, the laser printer and the process cartridge were left for 48 hours in a 23° C./50% RH environment, so as to adjust to the measurement environment, and the evaluation image was formed in the same environment. The evaluation image had the characters "E" on the upper part of the image, and had a half tone image below the center portion of the image. Table 8 and table 11 are the results thereof.

Figure 14:
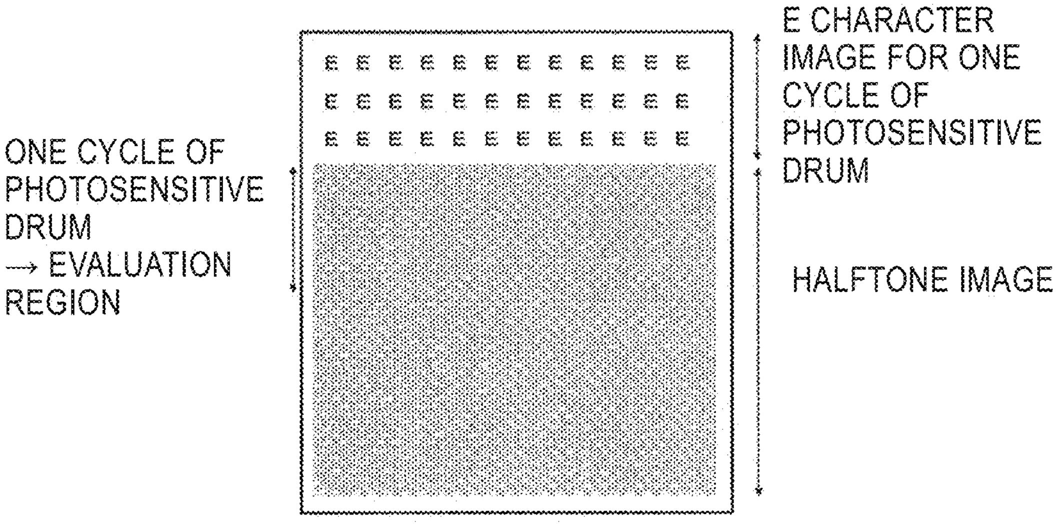
FIG. 14 is a schematic diagram depicting an image for evaluating a ghost image.

Specifically, in the upper 10 cm region of the image, the alphabetic characters "E" (size: 4 pt.) were printed so as to cover 4% of the surface area of the A4 sized paper. Thereby after the transfer process, the surface potential (before the charging process) of the photosensitive drum can form an initial unevenness along the surface potential corresponding to the characters "E" in a region covered by one cycle of the photosensitive drum. FIG. 14 is a diagram for describing this evaluation image.

Further, a halftone image (image generated by drawing horizontal lines of a 1 dot width and 2 dot space in the direction vertical to the rotating direction of the photosensitive drum) was outputted below the upper 10 cm. This halftone image was visually observed and evaluated based on the following standards. Table 8 and Table 11 are the results thereof.

Evaluating Characters "E" on Halftone Image

Rank A: No image unevenness caused by the characters "E" is observed on the halftone image, even if a microscope is used.

Rank B: No image unevenness caused by the characters "E" is visually observed on the halftone image, but is observed on part of the halftone image if a microscope is used.

Rank C: An image of the characters "E" is visually observed on part of the halftone image.

Rank D: An image of characters "E" is visually observed on the entire surface of the halftone image.

4-3. Evaluating White Spot Image

The following evaluation was performed to confirm the contamination resistant performance when the charging roller 1 is used over a long period of time.

First an electrophotographic type laser printer (product name: Laserjet Pro M203dw, made by HP Co.), was prepared as an electrophotographic apparatus. Then to perform the evaluation in a high-speed process, this laser printer was modified such that the number of sheets to be outputted per minute became 75 sheets/minute (A4 sized paper), which was more than the original output number of sheets. Here the output speed of the recording media was set to 370 mm/sec.

Then the charging roller 1, the electrophotographic image forming apparatus and the process cartridge were left for 48 hours in a 15° C./30% RH environment, so as to adjust to the measurement environment.

The charging roller 1, which was left in the above mentioned environment, was set as the charging roller of the process cartridge, and was attached to the laser printer. Then in the same environment, a total of 50,000 sheets of images were consecutively outputted.

For the outputted image, alphabetic characters "E" (size: 4 pt.) were printed at a print ratio of 1.0% on A4 sized paper.

Then a halftone image (image generated by drawing horizontal lines of a 1 dot width and 2 dot space in the direction vertical to the rotating direction of the photosensitive drum) was outputted. This halftone image was visually observed, and white spot images were evaluated based on the following standards.

Evaluating White Spot Images on Halftone Image

Rank A: No white spot image is observed on the halftone image even if a microscope is used.

Rank B: No white spot image is visually observed on the halftone image, but is observed if a microscope is used.

Rank C: A white spot image is visually observed on a part of the halftone image.

Rank D: A white spot image is visually observed on the entire surface of the halftone image.

Examples 2 to 24

Charging rollers 2 to 24 were prepared respectively by the same method as the charging roller 1 of Example 1, except that the starting materials were changed, as indicated in Table 6 and Table 7. In Example 7, the temperature in the kneader, when the carbon masterbatch (CMB) for forming the core was prepared, was changed to 150° C. Table 6 and Table 7 indicate the parts by mass and the physical properties of each starting material used for preparing each charging roller of the core. Table 8 indicates the result of characteristics evaluation and the image evaluation of the completed charging rollers 2 to 24.

TABLE 6

| Unvulcanized rubber composition for forming conductive layer | Rubber composition for forming matrix and shell (MSC) | | | | | | | | | | | | | |
|---|---|---|---|---|---|---|---|---|---|---|---|---|---|---|
| | First rubber | | | | | Third rubber | | | | | Filler | | Zinc | Zinc |
| | Rubber type | Abbreviation | Mooney viscosity | SP value | Parts | Rubber type | Abbreviation | Mooney viscosity | SP value | Parts | Abbreviation | Parts | oxide Parts | stearate Parts |
| E-1 | NBR | N230SV | 32 | 20 | 80 | EPDM | E505A | 47 | 16 | 20 | #30 | 40 | 5 | 2 |
| E-2 | CR | B31 | 40 | 17.4 | 80 | EPDM | E505A | 47 | 16 | 20 | #30 | 40 | 5 | 2 |
| E-3 | NBR | N230SV | 32 | 20 | 80 | BR | BR150B | 40 | 16.8 | 20 | #30 | 40 | 5 | 2 |
| E-4 | NBR | N230SV | 32 | 20 | 80 | IR | IR2200L | 70 | 16.5 | 20 | #30 | 40 | 5 | 2 |
| E-5 | NBR | N230SV | 32 | 20 | 80 | Butyl | JSR Butyl 065 | 32 | 15.8 | 20 | #30 | 40 | 5 | 2 |
| E-6 | NBR | N230SV | 32 | 20 | 80 | EPDM | E505A | 47 | 16 | 20 | #30 | 40 | 5 | 2 |
| E-7 | NBR | N230SV | 32 | 20 | 80 | EPDM | E505A | 47 | 16 | 20 | #30 | 40 | 5 | 2 |
| E-8 | NBR | N230SV | 32 | 20 | 80 | SBR | T2003 | 33 | 17 | 20 | #30 | 40 | 5 | 2 |
| E-9 | CR | B31 | 40 | 17.4 | 80 | SBR | T2003 | 33 | 17 | 20 | #30 | 40 | 5 | 2 |
| E-10 | NBR | N230SV | 32 | 20 | 80 | IR | IR2200L | 70 | 16.5 | 20 | #30 | 40 | 5 | 2 |
| E-11 | NBR | N230SV | 32 | 20 | 80 | BR | BR150B | 40 | 16.8 | 20 | #30 | 40 | 5 | 2 |
| E-12 | NBR | N230SV | 32 | 20 | 80 | SBR | T2003 | 33 | 17 | 20 | #30 | 40 | 5 | 2 |
| E-13 | NBR | N230SV | 32 | 20 | 80 | SBR | T2003 | 33 | 17 | 20 | #30 | 40 | 5 | 2 |
| E-14 | NBR | N230SV | 32 | 20 | 80 | SBR | T2003 | 33 | 17 | 20 | #30 | 40 | 5 | 2 |
| E-15 | NBR | N230SV | 32 | 20 | 80 | SBR | T2003 | 33 | 17 | 20 | #30 | 40 | 5 | 2 |
| E-16 | NBR | N230SV | 32 | 20 | 80 | SBR | T2003 | 33 | 17 | 20 | #30 | 40 | 5 | 2 |
| E-17 | NBR | N230SV | 32 | 20 | 80 | SBR | T2003 | 33 | 17 | 20 | #30 | 40 | 5 | 2 |
| E-18 | NBR | N230SV | 32 | 20 | 80 | SBR | T2003 | 33 | 17 | 20 | #30 | 40 | 5 | 2 |
| E-19 | NBR | N230SV | 32 | 20 | 80 | SBR | T2003 | 33 | 17 | 20 | #30 | 40 | 5 | 2 |
| E-20 | NBR | N230SV | 32 | 20 | 80 | SBR | T2003 | 33 | 17 | 20 | #30 | 40 | 5 | 2 |
| E-21 | NBR | N230SV | 32 | 20 | 80 | SBR | T2003 | 33 | 17 | 20 | #30 | 40 | 5 | 2 |
| E-22 | NBR | N230SV | 32 | 20 | 90 | SBR | T2003 | 33 | 17 | 10 | #30 | 40 | 5 | 2 |
| E-23 | NBR | N230SV | 32 | 20 | 70 | SBR | T2003 | 33 | 17 | 30 | #30 | 40 | 5 | 2 |
| E-24 | NBR | N230SV | 32 | 20 | 60 | SBR | T2003 | 33 | 17 | 40 | #30 | 40 | 5 | 2 |

TABLE 7

| Unvulcanized rubber composition for forming conductive layer | Rubber composition for forming core (CMB) | | | | | | | | | | |
|---|---|---|---|---|---|---|---|---|---|---|---|
| | Second rubber | | | | | Electronic conductive agent | | Zinc oxide | Zinc stearate | Ratio | |
| | Rubber type | Abbreviation | Mooney viscosity | SP value | Parts | Abbreviation | Parts | Parts | Parts | MSC Parts | CMB Parts |
| E-1 | EPDM | E505A | 47 | 16 | 100 | #7360SB | 60 | 5 | 2 | 74 | 26 |
| E-2 | EPDM | E505A | 47 | 16 | 100 | #7360SB | 60 | 5 | 2 | 74 | 26 |
| E-3 | BR | BR150B | 40 | 16.8 | 100 | #7360SB | 60 | 5 | 2 | 74 | 26 |
| E-4 | IR | IR2200L | 70 | 16.5 | 100 | #7360SB | 60 | 5 | 2 | 74 | 26 |
| E-5 | Butyl | JSR Butyl 065 | 32 | 15.8 | 100 | #7360SB | 60 | 5 | 2 | 74 | 26 |
| E-6 | EPDM | E505A | 47 | 16 | 100 | #7360SB | 60 | 5 | 2 | 74 | 26 |
| E-7 | EPDM | E505A | 47 | 16 | 100 | #7360SB | 60 | 5 | 2 | 74 | 26 |
| E-8 | EPDM | E505A | 47 | 16 | 100 | #7360SB | 60 | 5 | 2 | 74 | 26 |
| E-9 | EPDM | E505A | 47 | 16 | 100 | #7360SB | 60 | 5 | 2 | 74 | 26 |
| E-10 | EPDM | E505A | 47 | 16 | 100 | #7360SB | 60 | 5 | 2 | 74 | 26 |
| E-11 | EPDM | E505A | 47 | 16 | 100 | #7360SB | 60 | 5 | 2 | 74 | 26 |
| E-12 | IR | IR2200L | 70 | 16.5 | 100 | #7360SB | 60 | 5 | 2 | 74 | 26 |
| E-13 | BR | BR150B | 40 | 16.8 | 100 | #7360SB | 60 | 5 | 2 | 74 | 26 |
| E-14 | NBR | N230SV | 32 | 20 | 100 | #7360SB | 60 | 5 | 2 | 74 | 26 |
| E-15 | Butyl | JSR Butyl 065 | 32 | 15.8 | 100 | #7360SB | 60 | 5 | 2 | 74 | 26 |
| E-16 | EPDM | E505A | 47 | 16 | 100 | #7360SB | 30 | 5 | 2 | 74 | 26 |
| E-17 | EPDM | E505A | 47 | 16 | 100 | #7360SB | 40 | 5 | 2 | 74 | 26 |
| E-18 | EPDM | E505A | 47 | 16 | 100 | #7360SB | 80 | 5 | 2 | 74 | 26 |
| E-19 | EPDM | E505A | 47 | 16 | 100 | Tin oxide | 60 | 5 | 2 | 74 | 26 |
| E-20 | EPDM | E505A | 47 | 16 | 100 | #7360SB | 60 | 5 | 2 | 82 | 18 |
| E-21 | EPDM | E505A | 47 | 16 | 100 | #7360SB | 60 | 5 | 2 | 64 | 36 |
| E-22 | EPDM | E505A | 47 | 16 | 100 | #7360SB | 60 | 5 | 2 | 74 | 26 |
| E-23 | EPDM | E505A | 47 | 16 | 100 | #7360SB | 60 | 5 | 2 | 74 | 26 |
| E-24 | EPDM | E505A | 47 | 16 | 100 | #7360SB | 60 | 5 | 2 | 74 | 26 |

TABLE 8

| Example | Charging roller No. | Unvulcanized rubber composition for forming conductive layer | Roller physical property: Low frequency impedance Ω | Roller physical property: High frequency impedance slope | Charge attenuation rate % | Matrix Volume resistivity/ Ω · cm | Domain Core Volume resistivity/ Ω · cm | Domain Distance between cores/μm |
|---|---|---|---|---|---|---|---|---|
| 1 | 1 | E-1 | 8.90E+04 | −0.61 | 73 | 2.11E+09 | 5.94E+01 | 0.25 |
| 2 | 2 | E-2 | 2.28E+04 | −0.50 | 58 | 5.20E+10 | 4.75E+01 | 0.27 |
| 3 | 3 | E-3 | 8.72E+04 | −0.62 | 72 | 2.37E+09 | 4.96E+01 | 0.29 |
| 4 | 4 | E-4 | 7.59E+04 | −0.61 | 72 | 1.90E+09 | 5.86E+01 | 0.28 |
| 5 | 5 | E-5 | 6.21E+03 | −0.43 | 75 | 1.86E+09 | 6.21E+01 | 0.28 |
| 6 | 6 | E-6 | 6.58E+03 | −0.44 | 71 | 2.11E+09 | 5.55E+01 | 0.25 |
| 7 | 7 | E-7 | 2.22E+03 | −0.35 | 69 | 2.01E+09 | 5.88E+01 | 0.26 |
| 8 | 8 | E-8 | 8.40E+04 | −0.46 | 70 | 2.31E+09 | 6.13E+01 | 0.27 |
| 9 | 9 | E-9 | 8.31E+04 | −0.52 | 56 | 5.33E+10 | 4.57E+01 | 0.28 |
| 10 | 10 | E-10 | 6.10E+03 | −0.46 | 71 | 1.95E+09 | 5.29E+01 | 0.22 |
| 11 | 11 | E-11 | 2.28E+04 | −0.52 | 72 | 2.10E+09 | 6.39E+01 | 0.24 |
| 12 | 12 | E-12 | 8.43E+04 | −0.54 | 70 | 2.04E+09 | 5.47E+01 | 0.22 |
| 13 | 13 | E-13 | 8.72E+04 | −0.53 | 73 | 1.86E+09 | 4.82E+01 | 0.21 |
| 14 | 14 | E-14 | 8.40E+04 | −0.72 | 73 | 1.89E+09 | 4.98E+01 | 0.26 |
| 15 | 15 | E-15 | 8.26E+04 | −0.53 | 71 | 2.00E+09 | 4.44E+01 | 0.53 |
| 16 | 16 | E-16 | 2.52E+05 | −0.52 | 66 | 2.31E+09 | 4.87E+01 | 0.27 |
| 17 | 17 | E-17 | 8.91E+04 | −0.48 | 71 | 2.52E+00 | 4.19E+03 | 0.26 |
| 18 | 18 | E-18 | 4.23E+04 | −0.42 | 78 | 2.22E+09 | 2.10E+01 | 0.27 |
| 19 | 19 | E-19 | 9.14E+04 | −0.51 | 69 | 1.59E+00 | 5.66E+01 | 0.30 |

TABLE 8-continued

| | | | | | | | | |
|---|---|---|---|---|---|---|---|---|
| 20 | 20 | E-20 | 8.11E+04 | −0.36 | 72 | 2.25E+09 | 5.89E+01 | 0.21 |
| 21 | 21 | E-21 | 8.45E+04 | −0.54 | 71 | 1.97E+09 | 4.76E+01 | 0.72 |
| 22 | 22 | E-22 | 8.64E+04 | −0.37 | 71 | 1.94E+09 | 4.89E+01 | 0.30 |
| 23 | 23 | E-23 | 8.55E+04 | −0.42 | 69 | 2.06E+09 | 5.27E+01 | 0.28 |
| 24 | 24 | E-24 | 8.10E+04 | −0.48 | 68 | 2.05E+09 | 4.78E+01 | 0.29 |

| | Domain | | | | | | | Image |
|---|---|---|---|---|---|---|---|---|
| | Core | | | | | Image | | evaluation |
| | Electronic conductive | | Shell | | | evaluation 1 (ghost) | | 2 (white spots) |
| Example | agent cross-sectional area ratio % | Circumference ratio A/B | Volume resistivity/ Ω · cm | Thickness/ μm | Domain A quantity % | Black/white potential difference/V | Ghost image | White spot rank @ 50K |
| 1 | 26.0 | 1.06 | 3.10E+16 | 0.42 | 31 | 38 | B | A |
| 2 | 26.2 | 1.05 | 2.90E+16 | 0.14 | 33 | 39 | B | B |
| 3 | 26.4 | 1.05 | 3.30E+15 | 0.32 | 29 | 28 | B | A |
| 4 | 25.9 | 1.04 | 8.20E+15 | 0.24 | 34 | 26 | B | A |
| 5 | 26.3 | 1.07 | 7.70E+17 | 0.66 | 31 | 26 | B | A |
| 6 | 25.8 | 1.06 | 3.20E+16 | 0.45 | 53 | 19 | A | A |
| 7 | 26.1 | 1.07 | 3.40E+16 | 0.42 | 81 | 7 | A | A |
| 8 | 26.0 | 1.07 | 8.30E+13 | 0.25 | 71 | 19 | A | A |
| 9 | 26.3 | 1.05 | 7.90E+13 | 0.16 | 70 | 16 | A | B |
| 10 | 26.1 | 1.07 | 8.40E+15 | 0.31 | 73 | 8 | A | A |
| 11 | 26.0 | 1.05 | 3.13E+15 | 0.26 | 70 | 11 | A | A |
| 12 | 26.2 | 1.06 | 8.10E+13 | 0.31 | 69 | 19 | A | A |
| 13 | 26.2 | 1.07 | 7.81E+13 | 0.29 | 71 | 18 | A | A |
| 14 | 26.4 | 1.05 | 8.27E+13 | 0.30 | 30 | 41 | C | A |
| 15 | 25.9 | 1.06 | 8.34E+13 | 0.32 | 71 | 15 | A | A |
| 16 | 19.4 | 1.12 | 8.54E+13 | 0.29 | 69 | 32 | B | A |
| 17 | 20.7 | 1.10 | 8.28E+13 | 0.33 | 70 | 20 | A | A |
| 18 | 27.4 | 1.02 | 8.11E+13 | 0.32 | 73 | 14 | A | A |
| 18 | 26.0 | 1.10 | 8.05E+13 | 0.31 | 71 | 19 | A | A |
| 20 | 26.1 | 1.05 | 8.74E+13 | 0.52 | 81 | 4 | A | A |
| 21 | 26.0 | 1.05 | 7.67E+13 | 0.25 | 57 | 25 | B | A |
| 22 | 25.9 | 1.05 | 8.55E+13 | 0.23 | 68 | 6 | A | A |
| 23 | 26.3 | 1.07 | 8.80E+13 | 0.41 | 72 | 20 | A | A |
| 24 | 26.1 | 1.04 | 8.99E+13 | 0.68 | 75 | 24 | A | A |

In the above tables, 8.90E+04, for example, indicates $8.90\times10^4$. This is the same for each of the following tables.

Comparative Examples 1 to 6

Charging rollers 25 to 30 were prepared respectively by the same method as in Example 1, except that the materials to be used were changed as indicated in Table 9 and Table 10. Table 11 indicates the results of characteristic evaluation and image evaluation of the completed charging rollers 25 to 30.

In Comparative Example 1, the volume resistivity of the matrix was high, hence charging could be performed in the domain, and ghost images could be suppressed. On the other hand, the volume resistivity in the outer peripheral region of the domain (that is, the matrix) was high, hence the charge attenuation rate was low, and white spots were generated.

In Comparative Example 2, the volume resistivity of the matrix was low, hence the charge attenuation rate was high, and white spots could be suppressed. On the other hand, the volume resistivity in the outer edge region (that is, the matrix) was low, hence sufficient charging could not be performed in the domain, and ghost images were generated.

In Comparative Example 3, the domain-matrix structure was not included, and the effect of the domain to suppress the movement of charges could not be obtained, hence ghost images were generated.

In Comparative Example 4, the value of the low frequency impedance is $5.50\times10^{10}\Omega$, which is higher than $1.00\times10^{7}\Omega$. Hence a smooth discharge was diminished, and the discharge amount did not reach the level of filling the surface potential unevenness. As a result, ghost image were generated.

In Comparative Example 5, a material of which DBP oil absorption was high was used for the electronic conductive agent, and the kneading time to form the unvulcanized rubber composition was 5 minutes. Since the centroid of volume of the domain did not exist inside the domain in this structure, conduction was not uniform and leaking of discharge was generated depending on the location, and as a result, ghost images were generated.

In Comparative Example 6, the core does not contain the electronic conductive agent, and is ion-conductive. In the case of an ion-conductive core, there was no charge-storing capability at the interface between the electronic conductive agent and the second rubber in the domain, and the effect of suppressing the leaking of charges in the domain diminished, and as a result, ghost images were generated. Further, the configuration of ion conduction, transporting speed of charges is slower than electronic conduction, and the high impedance slope value is −0.90, which is smaller than −0.80. Hence leaking of discharge was more easily generated, and white spot images were generated.

TABLE 9

| Unvulcanized rubber composition for forming conductive layer | Rubber composition for forming matrix and shell (MSC) | | | | | | | | | | | | | |
|---|---|---|---|---|---|---|---|---|---|---|---|---|---|---|
| | First rubber | | | | | Third rubber | | | | | Filler | | Zinc | Zinc |
| | Rubber type | Abbre-viation | Mooney viscosity | SP value | Parts | Rubber type | Abbre-viation | Mooney viscosity | SP value | Parts | Abbre-viation | Parts | oxide Parts | stearate Parts |
| E-25 | SBR | T2003 | 33 | 17 | 100 | — | — | — | — | — | #30 | 40 | 5 | 2 |
| E-26 | NBR | N230SV | 32 | 20 | 100 | — | — | — | — | — | #30 | 40 | 5 | 2 |
| E-27 | — | — | — | — | — | — | — | — | — | — | — | — | — | — |
| E-28 | NBR | N230SV | 32 | 20 | 80 | EPDM | E505A | 47 | 16 | 20 | #30 | 40 | 5 | 2 |
| E-29 | NBR | N230SV | 32 | 20 | 80 | EPDM | E505A | 47 | 16 | 20 | #30 | 40 | 5 | 2 |
| E-30 | NBR | N202S | 57 | 20.4 | 80 | NBR | N230SV | 32 | 20 | 80 | #30 | 40 | 5 | 2 |

TABLE 10

| Unvulcanized rubber composition for forming conductive layer | Rubber composition for forming core (CMB) | | | | | | | | | Ratio | |
|---|---|---|---|---|---|---|---|---|---|---|---|
| | Second rubber | | | | | Electronic conductive agent | | Zinc oxide | Zinc stearate | MSC | CMB |
| | Rubber type | Abbreviation | Mooney viscosity | SP value | Parts | Abbreviation | Parts | Parts | Parts | Parts | Parts |
| E-25 | NBR | N230SV | 32 | 20 | 100 | #7360SB | 60 | 5 | 2 | 74 | 26 |
| E-26 | SBR | T2003 | 33 | 17 | 100 | #7360SB | 60 | 5 | 2 | 74 | 26 |
| E-27 | EPDM | E505A | 47 | 16 | 100 | #7360SB | 60 | 5 | 2 | 0 | 100 |
| E-28 | EPDM | E505A | 47 | 16 | 100 | #7360SB | 60 | 5 | 2 | 95 | 5 |
| E-29 | EPDM | E505A | 47 | 16 | 100 | EC100J | 5 | 5 | 2 | 74 | 26 |
| E-30 | ECO | CG102 | 64 | 18.5 | 100 | — | — | 5 | 2 | 74 | 26 |

TABLE 11

| Example | Charging roller No. | Unvulcanized rubber composition for forming conducive layer | Roller physical property: Low frequency impedance Ω | Roller physical property: High frequency impedance slope | Charge attenuaion rate % | Domain: Matrix Volume resistivity/ Ω · cm | Domain: Core Volume resistivity/ Ω · cm | Domain: Core Distance between cores/μm |
|---|---|---|---|---|---|---|---|---|
| Comparative Example 1 | 25 | E-25 | 8.78E+04 | −0.63 | 36 | 5.92E+12 | 6.99E+01 | 0.26 |
| Comparative Example 2 | 26 | E-26 | 1.57E+07 | −1.00 | 71 | 2.58E+09 | 5.21E+01 | 0.23 |
| Comparative Example 3 | 27 | E-27 | 2.55E+08 | −1.00 | 85 | — | — | — |
| Comparative Example 4 | 28 | E-28 | 5.50E+10 | −0.85 | 75 | 3.55E+09 | 2.22E+01 | 1.22 |
| Comparative Example 5 | 29 | E-29 | 2.20E+05 | −0.86 | 65 | 5.50E+09 | 2.30E+01 | 1.55 |
| Comparative Example 6 | 30 | E-30 | 5.50E+09 | −0.90 | 33 | 2.20E+09 | 2.50E+06 | 0.23 |

| Example | Domain: Core Electonic conductive agent cross-sectional area ratio % | Domain: Core Circum-ference ratio A/B | Domain: Shell Volume resistivity Ω · cm | Domain: Shell Thickness/ μm | Domain A quantity % | Image evaluation 1 (ghost): Black/white potential diference/V | Image evaluation 1 (ghost): Ghost image | Image evaluation 2 (white spots): White spot rank @ 50K |
|---|---|---|---|---|---|---|---|---|
| Comparative Example 1 | 26.6 | 1.08 | — | — | — | 36 | B | D |

TABLE 11-continued

| | | | | | | | | |
|---|---|---|---|---|---|---|---|---|
| Comparative Example 2 | 26.3 | 1.04 | — | — | — | 62 | D | A |
| Comparative Example 3 | — | — | — | — | — | 65 | D | B |
| Comparative Example 4 | 26.2 | 1.02 | 5.50E+16 | 0.32 | 12 | 62 | D | B |
| Comparative Example 5 | 12.1 | 1.15 | 3.50E+16 | 0.55 | 5 | 60 | D | B |
| Comparative Example 6 | — | 1.1 | 3.20E+16 | 0.34 | 25 | 64 | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-060924, filed Apr. 4, 2024 which is hereby incorporated by reference herein in its entirety.

What is claimed is:

1. An electrophotographic member, comprising:

a support member having a conductive outer surface; and a conductive layer disposed on an outer surface of the support member, wherein the conductive layer comprises a matrix comprising a first rubber, and a plurality of domains dispersed in the matrix, volume resistivity of the matrix is $1.00\times10^{12}$ Ω·cm or less, the plurality of domains comprise at least one domain A, and the domain A satisfies <Condition 1> to <Condition 3> below:

<Condition 1> the domain A comprises a second rubber and an electronic conductive agent;

<Condition 2> a centroid of volume of the domain A exists in the domain A;

<Condition 3> on a cross-section of the domain A passing through the centroid of volume, volume resistivity of an outer peripheral region, which is a region of a 100 nm distance from an outer edge of the domain A toward the centroid of volume, is more than $1.00\times10^{12}$ Ω·cm, and wherein in a case where a platinum electrode is directly disposed on an outer surface of the electrophotographic member, impedance is measured by applying AC voltage having a 1V amplitude between the outer surface of the support member and the platinum electrode in an environment of a 23° C. temperature and 50% relative humidity, while changing frequency in a range of $1.0\times10^{-2}$ to $1.0\times10^{7}$ Hz, and the frequency is plotted on an abscissa and the impedance is plotted on an ordinate of a log-log graph, a slope at a frequency range of $1.0\times10^{5}$ to $1.0\times10^{6}$ Hz is −0.80 to −0.30, and the impedance in a frequency range of $1.0\times10^{-2}$ to $1.0\times10^{1}$ Hz is $1.00\times10^{1}$ to $1.00\times10^{7}$Ω.

2. The electrophotographic member according to claim 1, wherein in at least eight samples out of cubic samples of which one side is 6 μm and are sampled from nine locations of the conductive layer, a ratio of the number of domains A with respect to a total number of plurality of domains is more than 50 quantity %.

3. The electrophotographic member according to claim 1, wherein the domain A has a core-shell structure constituted of a core and a shell surrounding the core, the shell comprises a third rubber, the core comprises the second rubber and the electronic conductive agent in the second rubber, and the third rubber and the second rubber are different from each other.

4. The electrophotographic member according to claim 3, wherein volume resistivity of the core is $1.00\times10^{1}$ to $1.00\times10^{4}$ Ω·cm.

5. The electrophotographic member according to claim 3, wherein a ratio of a cross-sectional area of the electronic conductive agent comprised in the core, with respect to a cross-sectional area of the core, is 20 area % or more.

6. The electrophotographic member according to claim 3, wherein the electronic conductive agent is carbon black.

7. The electrophotographic member according to claim 3, wherein in a case where a circumference of the core is A and an envelope circumference of the core is B, A and B satisfy Expression (6) below:

$$1.00 \le A/B \le 1.10. \qquad (6)$$

8. The electrophotographic member according to claim 3, wherein the domain A comprises a plurality of cores, and an arithmetic average value Dm of a distance between cores is 0.20 to 2.00 μm.

9. The electrophotographic member according to claim 1, wherein the first rubber is at least one rubber selected from the group consisting of acrylonitrile-butadiene rubber, chloroprene rubber and hydrin rubber.

10. The electrophotographic member according to claim 1, wherein the second rubber is at least one rubber selected from the group consisting of natural rubber, butadiene rubber, butyl rubber, acrylonitrile-butadiene rubber, urethane rubber, silicon rubber, fluoro rubber, isoprene rubber, chloroprene rubber, styrene-butadiene rubber, ethylene-propylene rubber and polynorbornene rubber.

11. The electrophotographic member according to claim 3, wherein the third rubber is at least one rubber selected from the group consisting of natural rubber, butadiene rubber, butyl rubber, isoprene rubber, styrene-butadiene rubber and ethylene-propylene rubber.

12. A process cartridge detachably attached to a main body of an electrophotographic image forming apparatus, wherein the process cartridge comprises:

an electrophotographic photosensitive member; and a charging member arranged so as to be capable of charging the electrophotographic photosensitive member, and the charging member is the electrophotographic member according to claim 1.

13. An electrophotographic image forming apparatus, comprising: an electrophotographic photosensitive member; and a charging roller arranged so as to be capable of charging the electrophotographic photosensitive member, wherein the charging roller is the electrophotographic member according to claim 1.

* * * * *